United States Patent
Patil et al.

(10) Patent No.: US 12,499,608 B2
(45) Date of Patent: Dec. 16, 2025

(54) METHODS AND SYSTEMS FOR MULTIPLANAR REFORMATION WITH MACHINE LEARNING BASED IMAGE ENHANCEMENT

(71) Applicant: GE Precision Healthcare LLC, Waukesha, WI (US)

(72) Inventors: Rohan Keshav Patil, Karnataka (IN); Sudhanya Chatterjee, Karnataka (IN); Dattesh Dayanand Shanbhag, Karnataka (IN)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 382 days.

(21) Appl. No.: 18/356,083

(22) Filed: Jul. 20, 2023

(65) Prior Publication Data

US 2025/0029316 A1    Jan. 23, 2025

(51) Int. Cl.
*G06T 15/08* (2011.01)
*G06T 3/40* (2024.01)
*G06T 7/11* (2017.01)

(52) U.S. Cl.
CPC .............. *G06T 15/08* (2013.01); *G06T 3/40* (2013.01); *G06T 7/11* (2017.01);
(Continued)

(58) Field of Classification Search
CPC ....... A61B 5/0037; G06T 3/40; G06T 3/4046; G06T 3/4076; G06T 5/70; G06T 7/11;
(Continued)

(56) References Cited

U.S. PATENT DOCUMENTS

| | | |
|---|---|---|
| 10,275,130 B2 | 4/2019 | De Swarte et al. |
| 2020/0037962 A1 | 2/2020 | Shanbhag et al. |

(Continued)

OTHER PUBLICATIONS

Chaudhar et al. "Deep learning super-resolution enables rapid simultaneous morphological and quantitative magnetic resonance imaging." International Workshop on Machine Learning for Medical Image Reconstruction. Cham: Springer International Publishing, 2018. (Year: 2018).*

(Continued)

*Primary Examiner* — Katrina R Fujita
(74) *Attorney, Agent, or Firm* — McCoy Russell LLP

(57) ABSTRACT

The disclosure relates to multiplanar reformation of three-dimensional medical images. In particular, the invention provides a method for reformatting image sequences by determining a landmark plane intersecting a volume, acquiring an image sequence, reformatting the image sequence along the landmark plane to produce a first reformatted image sequence, perturbing the landmark plane to produce a perturbed landmark plane, reformatting the first reformatted image sequence along the perturbed landmark plane to produce a second reformatted image sequence, mapping the second reformatted image sequence, the image sequence, and the landmark plane, to a resolution enhanced image sequence using a trained image enhancement network, and displaying the resolution enhanced image sequence via a display device. The present disclosure provides approaches which may reduce image artifacts in retrospectively reformatted image sequences, particularly in cases of retrospective reformatting of medium or low-resolution image sequences, without relying on acquisition of high-resolution 3D images.

20 Claims, 12 Drawing Sheets

(52) U.S. Cl.
CPC .............. *G06T 2207/10016* (2013.01); *G06T 2207/10088* (2013.01); *G06T 2207/20081* (2013.01); *G06T 2207/20084* (2013.01)

(58) Field of Classification Search
CPC ........... G06T 15/08; G06T 2208/10016; G06T 2208/10028; G06T 2208/10081; G06T 2208/10088; G06T 2208/20081; G06T 2208/20084
See application file for complete search history.

(56) References Cited

U.S. PATENT DOCUMENTS

| | | | |
|---|---|---|---|
| 2020/0311926 A1* | 10/2020 | Tian | G06T 3/4053 |
| 2022/0358692 A1 | 11/2022 | Bhushan et al. | |
| 2023/0052595 A1* | 2/2023 | Langoju | G06T 3/4046 |
| 2023/0293014 A1* | 9/2023 | Shanbhag | A61B 5/0033 382/128 |

OTHER PUBLICATIONS

Chaudhar et al. "Super-resolution musculoskeletal MRI using deep learning." Magnetic resonance in medicine 80.5 (2018): 2139-2154. (Year: 2018).*

Chen et al. "Efficient and accurate MRI super-resolution using a generative adversarial network and 3D multi-level densely connected network." International conference on medical image computing and computer-assisted intervention. Cham: Springer International Publishing, 2018. (Year: 2018).*

Park et al. "Computed tomography super-resolution using deep convolutional neural network." Physics in Medicine & Biology 63.14 (2018): 145011. (Year: 2018).*

* cited by examiner

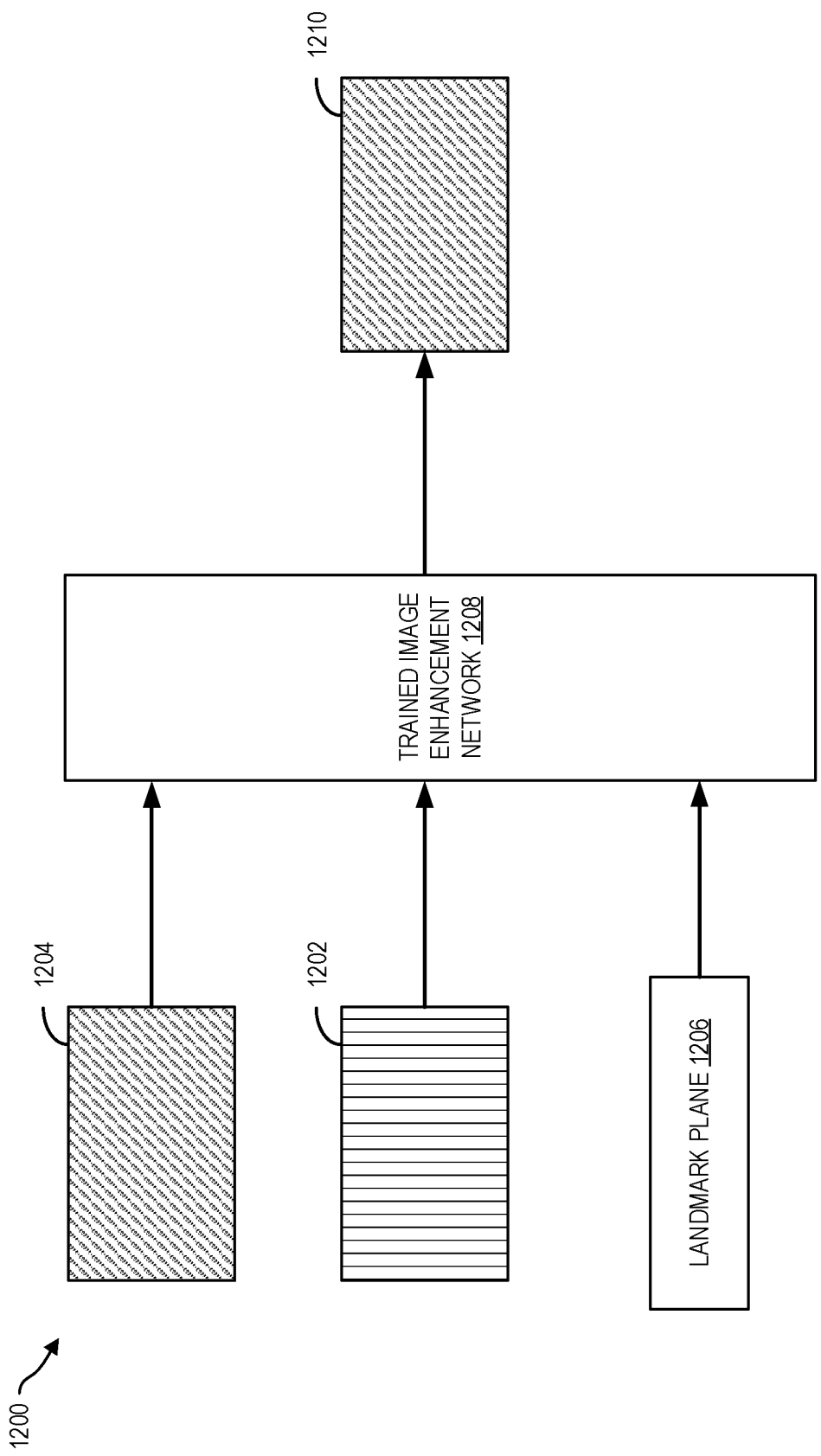

METHODS AND SYSTEMS FOR MULTIPLANAR REFORMATION WITH MACHINE LEARNING BASED IMAGE ENHANCEMENT

FIELD

Embodiments of the subject matter disclosed herein relate to medical imaging, and more particularly, to multiplanar reformation of three-dimensional medical images.

BACKGROUND

Non-invasive imaging technologies allow images of a subject's internal structures and/or features to be acquired without performing an invasive procedure on the subject. In particular, non-invasive imaging technologies rely on various physical principles to acquire data and to construct images or otherwise represent the observed internal structures and/or features of the subject. Such physical principles include differential transmission of x-rays through a target volume, reflection of acoustic waves within the volume, paramagnetic properties of different tissues and materials within the volume, breakdown of targeted radionuclides within the subject, etc.

Data acquired via non-invasive imaging at an anatomic region-of-interest (ROI) may be reconstructed into an image or image sequence. For example, multiplanar reconstruction or reformatting (MPR) may be used to convert a first sequence of 2D images parallel to a first plane into a second sequence of 2D images parallel to a second plane, where the first and second planes are not parallel. MPR may be employed to reformat a previously acquired image sequence to capture views of anatomical regions of interest in standard/pre-determined orientations, which were not originally captured in the first image sequence. This process of reconstructing previously acquired image sequences is referred to as retrospective MPR. One limitation of retrospective MPR is that reformation of insufficiently high-resolution image sequences may result in artifacts such as image blur or step edges.

A conventional solution to this problem is to impose constraints on the data resolution requirements (e.g. 0.25 mm isotropic) before the reformatting process is used. This, however, may limit the utility of such an application in clinical practice, as it increases the scan time and can suffer from patient motion or contrast changes in the data. Even with a high-resolution image sequence, the process of reformatting can introduce blur due to interpolation, which can affect the quality of the reformatted images. Therefore, it is generally desired to explore approaches for reducing image artifacts in retrospectively reformatted image sequences, particularly in cases of retrospective reformatting of medium or low-resolution image sequences.

BRIEF DESCRIPTION

In one embodiment, a method, for reformatting image sequences comprises, determining a landmark plane intersecting a volume, acquiring an image sequence, reformatting the image sequence along the landmark plane to produce a first reformatted image sequence, perturbing the landmark plane to produce a perturbed landmark plane, reformatting the first reformatted image sequence along the perturbed landmark plane to produce a second reformatted image sequence, mapping the second reformatted image sequence, the image sequence, and the landmark plane, to a resolution enhanced image sequence, using a trained image enhancement network, and displaying the resolution enhanced image sequence via a display device. In this way, image quality for retrospectively reformatted images may be increased without relying on acquisition of high-resolution 3D images. Further, the inventors herein have determined that a relationship exists between the orientation of the retrospectively reformatted image sequence with respect to the originally acquired image sequence (e.g., the orientation of the landmark plane with respect to the orientation of the images comprising the originally acquired image sequence) and the artifacts present in the reformatted image sequence. Thus, by informing the image enhancement network of the relative orientation of the reformatted image sequence with respect to the originally acquired image sequence (e.g., by feeding the landscape plane to the image enhancement network), a degree of artifact attenuation in the resolution enhanced image sequence may be increased.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present disclosure will be better understood from reading the following description of non-limiting embodiments, with reference to the attached drawings, wherein below:

FIG. 12 is a diagram illustrating the second embodiment of the method for performing retrospective reconstruction of an image sequence using a trained image enhancement network, according to an embodiment of the disclosure.

DETAILED DESCRIPTION

Figure 1:
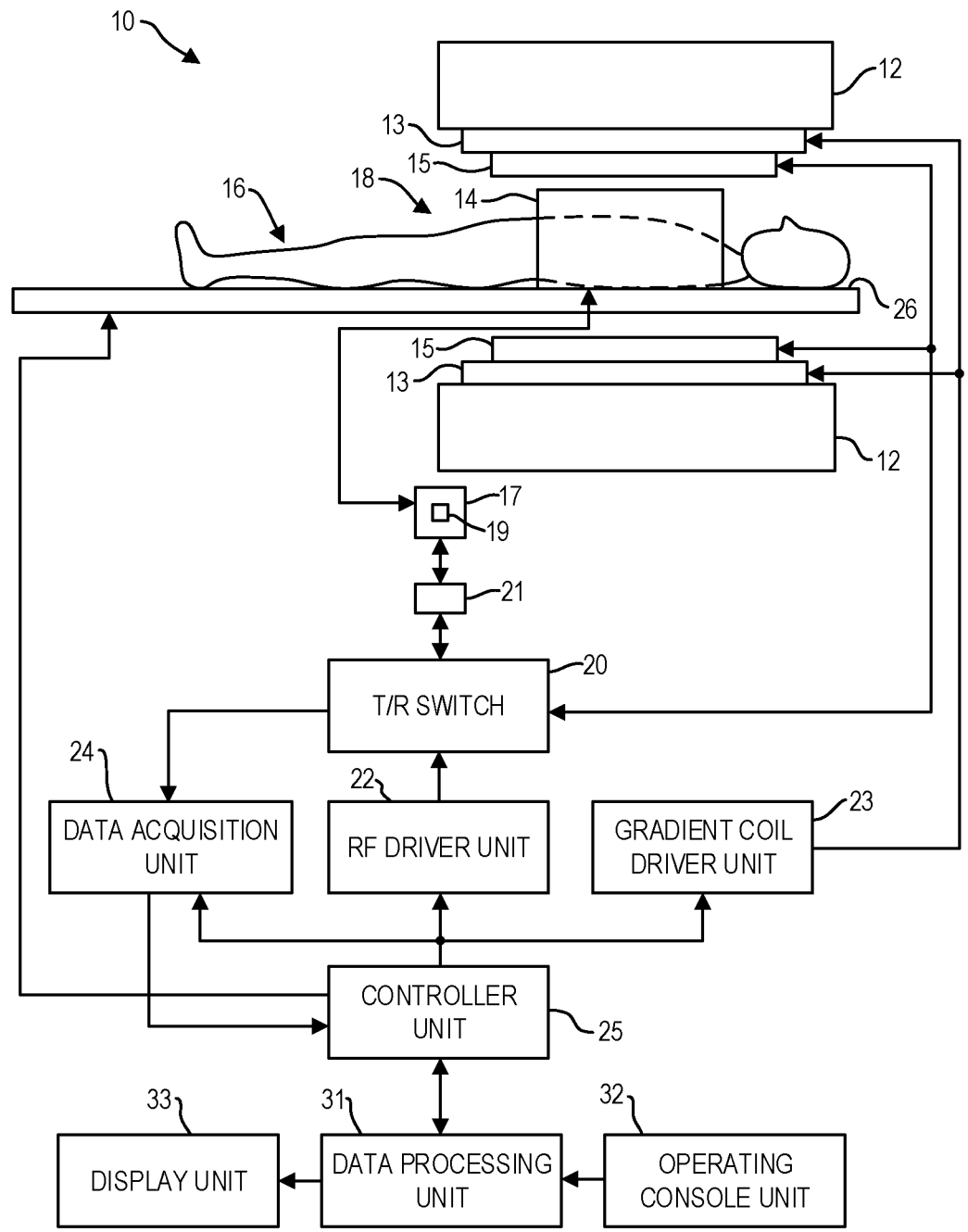
FIG. 1 is a block diagram of an MRI system, according to an embodiment of the disclosure.

The following description relates to various methods and systems for reformatting image sequences using multiplanar reconstruction/reformatting (MPR). In some imaging workflows, one or more planes of interest, which capture pre-determined anatomical regions in pre-determined orientations (also referred to herein as scan plan prescriptions), may be automatically determined, either prior to a diagnostic image sequence acquisition (e.g., by identifying the planes of interest using three-plane localizer images) or following acquisition of the diagnostic image sequence (e.g., by identifying the planes of interest within the diagnostic image sequence itself). In either case, the planes of interest are unlikely to be parallel to the images comprising the diagnostic image sequence, and therefore MPR may be performed to generate a "synthetic" image sequence from the diagnostic image sequence, wherein the "synthetic" (i.e., reformatted) image sequence comprises a plurality of images which are parallel to the plane of interest, thus enabling observation of an anatomical feature of interest in the pre-determined orientation and plane.

One limitation of the above approach is that reformation of insufficiently high-resolution image sequences may result in artifacts such as image blur or step edges. A conventional solution to this problem is to impose constraints on the data resolution requirements (e.g., by acquiring a diagnostic scan with a voxel size of 0.25 mm×0.25 mm×0.25 mm) before the reformatting process is used. This, however, may limit the utility of such an application in clinical practice, as it increases the scan time and can suffer from patient motion or contrast changes in the data. Even with a high-resolution image sequence, the process of reformatting can introduce blur due to interpolation, which can affect the quality of the reformatted images. Therefore, it is generally desired to explore approaches for reducing image artifacts in retrospectively reformatted image sequences, particularly in cases of retrospective reformatting of medium or low-resolution image sequences.

The inventors herein have determined that a relationship exists between the orientation of reformatted image sequences with respect to acquired diagnostic image sequences (e.g., the orientation of the plane of interest as defined relative to the images comprising the originally acquired "native" image sequence) and the artifacts present in the reformatted image sequence. Conventional deep learning approaches for reducing blur or other image artifacts in medical images do not account for the reformat orientation dependence of such artifacts, and therefore perform with uneven efficacy on different planes of interest. However, the inventors herein have developed approaches which at least partially address the above identified issues. In one embodiment, by informing an image enhancement network of the relative orientation of the reformatted image sequence with respect to the native image sequence (e.g., by feeding the plane of interest/landmark plane to the image enhancement network along with the native image sequence and the reformatted image sequence), a resolution enhanced image sequence may be produced, with greater artifact attenuation and greater consistency of artifact attenuation across various planes of interest, than conventional approaches. Further, by training an image enhancement network with input data comprising reformatted image sequences and the landmark plane used to produce the reformatted image sequence, and with ground truth data comprising a high resolution equivalent of the reformatted image sequence, the image enhancement network may implicitly learn the relationship between reformat plane orientation (relative to diagnostic scan plane orientation/native scan plane orientation) and the reformat/interpolation artifacts present in reformatted image sequences.

In one example, a diagnostic image sequence of a volume (e.g., an imaging subject) may be acquired using a magnetic resonance imaging (MRI) apparatus 10, shown in FIG. 1. The MRI apparatus 10 may further acquire three-plane localizer images of the volume prior to acquisition of the diagnostic image sequence. An imaging system 200, shown in FIG. 2, may receive the diagnostic image sequence, along with the three-plane localizer images of the volume, and may determine a landmark plane or other plane of interest based on the three-plane localizer images, and may reformat the diagnostic/native image sequence along the landmark plane to generate one or more images showing a pre-determined anatomical region in a pre-determined orientation. The imaging system 200 may execute one or more operations of method 900, shown in FIG. 9, to produce a resolution enhanced image sequence from the image sequence reformatted along the landmark plane, using a trained image enhancement network, wherein an illustration of method 900 is shown in FIG. 10. Alternatively, the imaging system 200 may execute a second method 1100, shown in FIG. 11, to produce a resolution enhanced image sequence from an image sequence reformatted along a perturbed landmark plane, wherein an illustration of method 1100 is shown in FIG. 12.

Figure 6:
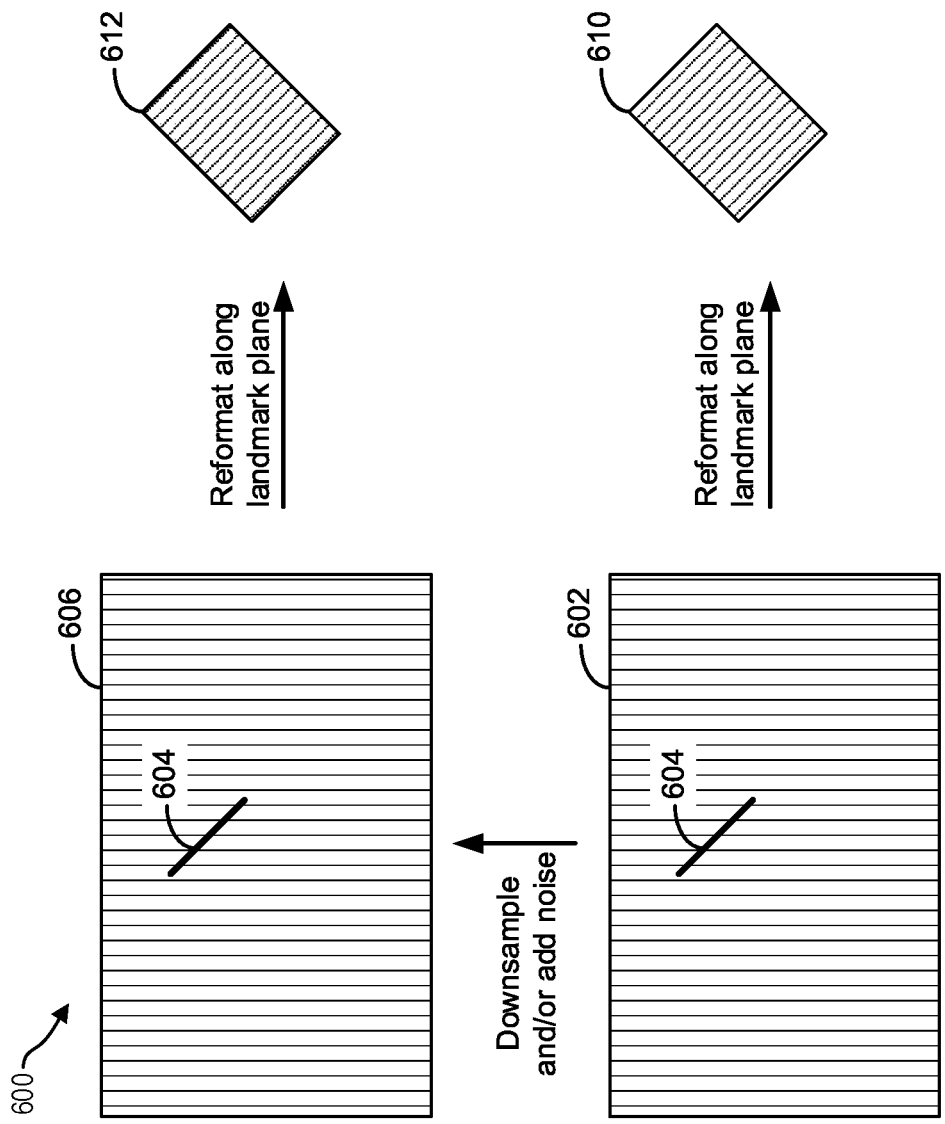
FIG. 6 is a diagram illustrating the second method for generating training data for an image enhancement network, according to an embodiment of the disclosure.
Figure 7:
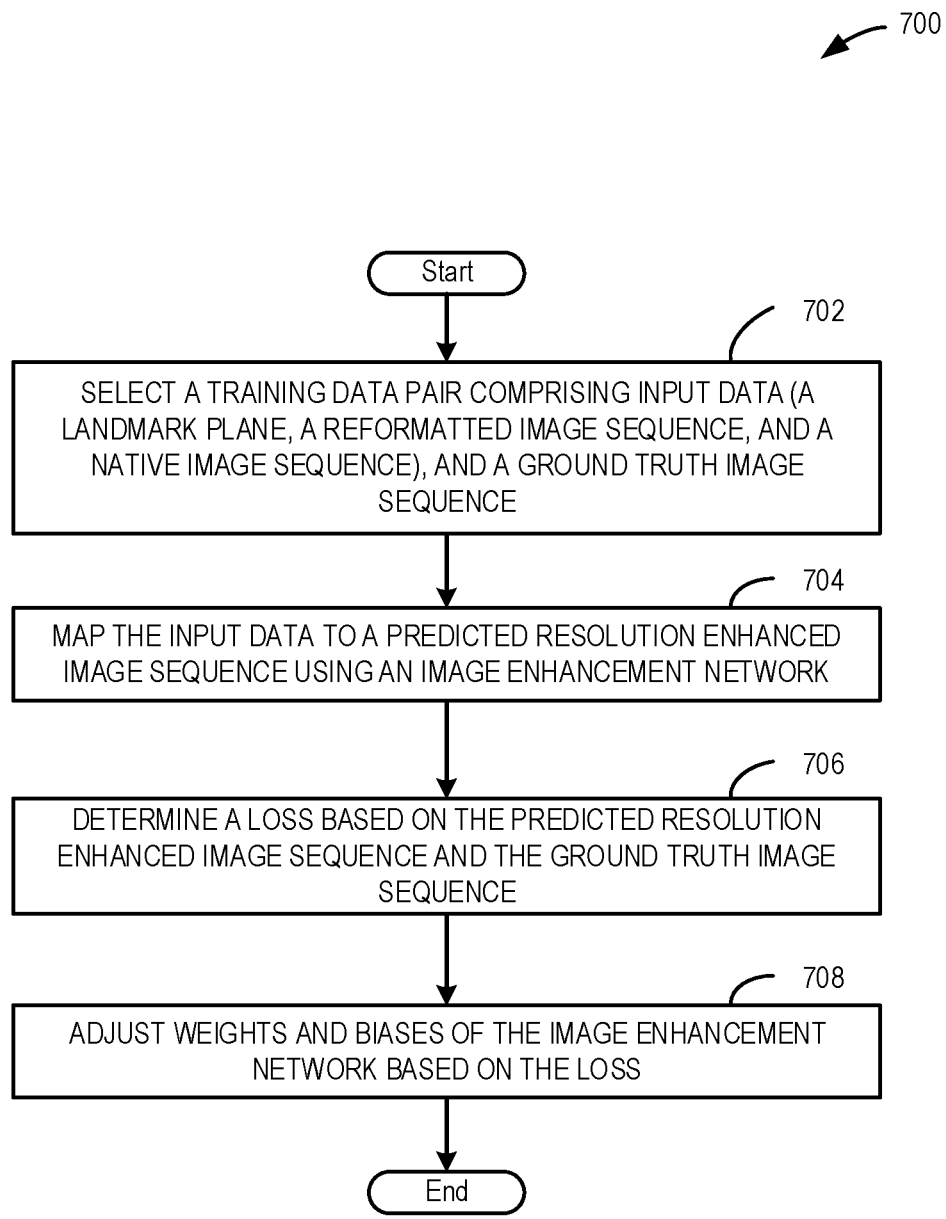
FIG. 7 is a flowchart of one embodiment of a method for training an image enhancement network using the training data generated according to the herein disclosed approaches.
Figure 8:
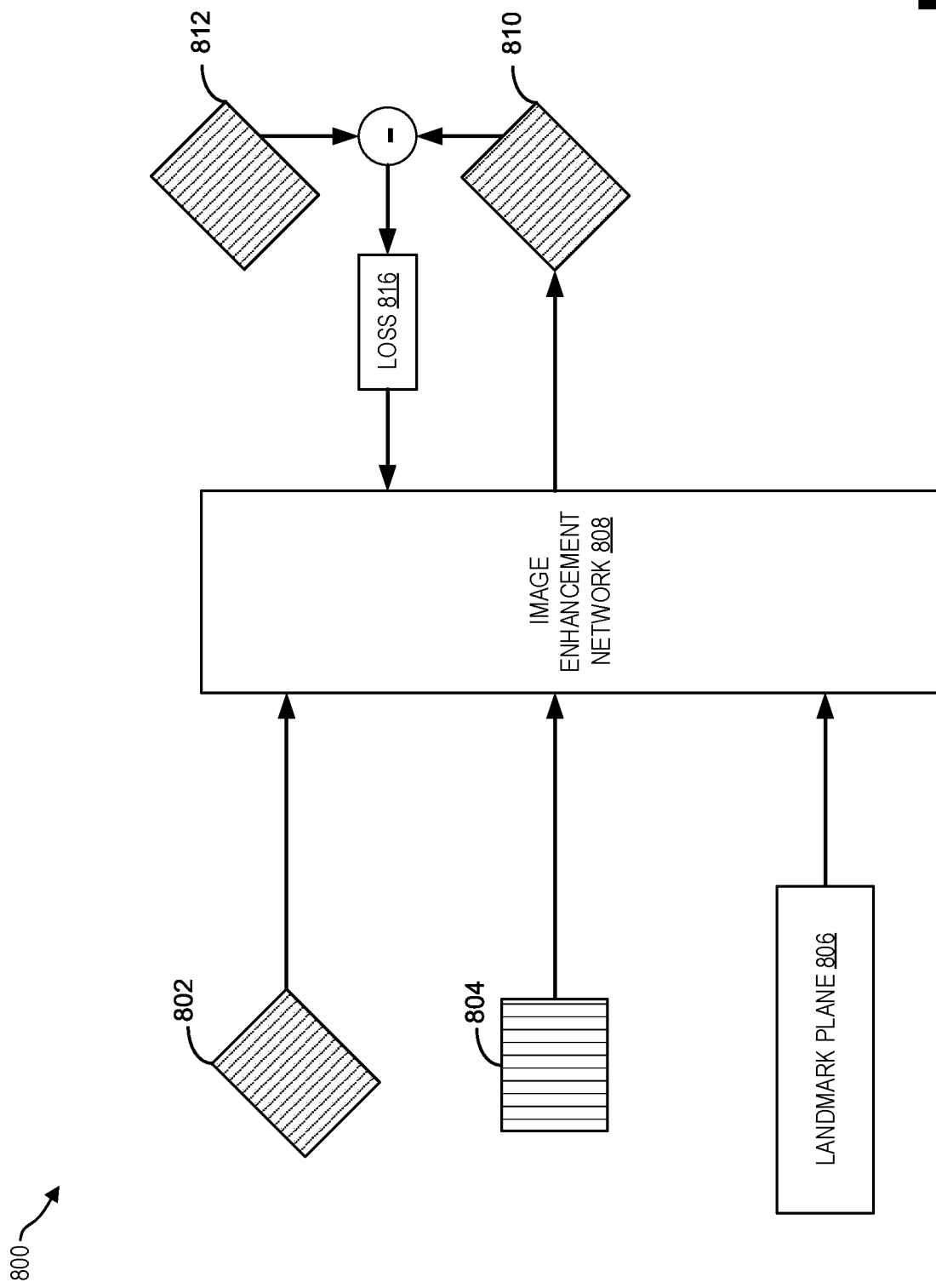
FIG. 8 is a diagram illustrating a method of training an image enhancement network, according to an embodiment of the disclosure.

The image enhancement network of methods 900 or 1100 may be trained according to one or more operations of method 700, shown in FIG. 7, and illustrated in FIG. 8. Training data pairs used in method 700 may be generated in a first embodiment by executing one or more operations of method 300, shown in FIG. 3 and illustrated in FIG. 4. The training data pairs used in method 700 may be generated in a second embodiment by executing one or more operations of method 500, shown in FIG. 5 and illustrated in FIG. 6. The image enhancement network is configured and trained to utilize the reformat plane, along with the reformatted image sequence, to intelligently attenuate artifacts introduced by the MPR process into the reformatted image sequence.

As used herein, the term native image sequence may be used synonymously with the term unreformatted image sequence, or originally acquired image sequence, and refers to a sequence of images which have not undergone MPR, and therefore retain an original or "native" orientation. In some instances, image sequences which have been modified from their originally acquired state, e.g., by downsampling or adding noise, may also be referred to as a native image sequence, to denote the orientation of the 2D images comprising said "native" image sequence retain a same orientation as the originally acquired image sequence from which they are produced. However, image sequences which have undergone MPR (i.e., reformatted image sequences) are not referred to herein as native images or native image sequences, regardless of the orientation of the 2D images comprising said image sequences, even if the orientation of the 2D images is the same as the orientation of the originally acquired image sequence from which the reformatted image sequence is produced.

Referring now to FIG. 1, a magnetic resonance imaging (MRI) apparatus 10 is shown, wherein the MRI apparatus 10 includes a magnetostatic field magnet unit 12, a gradient coil unit 13, an RF coil unit 14, an RF body or volume coil unit 15, a transmit/receive (T/R) switch 20, an RF driver unit 22, a gradient coil driver unit 23, a data acquisition unit 24, a controller unit 25, a patient table or bed 26, a data processing unit 31, an operating console unit 32, and a display unit 33. In some embodiments, the RF coil unit 14 is a surface coil, which is a local coil typically placed proximate to the anatomy of interest of a subject 16. Herein, the RF body coil unit 15 is a transmit coil that transmits RF signals, and the local surface RF coil unit 14 receives the MR signals. As such, the transmit body coil (e.g., RF body coil unit 15) and the surface receive coil (e.g., RF coil unit 14) are separate but electromagnetically coupled components. The MRI apparatus 10 transmits electromagnetic pulse signals to the subject 16 placed in an imaging space 18 with a static magnetic field formed to perform a scan for obtaining magnetic resonance signals from the subject 16. One or more images of the subject 16 can be reconstructed based on the magnetic resonance signals thus obtained by the scan.

The magnetostatic field magnet unit 12 includes, for example, an annular superconducting magnet, which is mounted within a toroidal vacuum vessel. The magnet defines a cylindrical space surrounding the subject 16 and generates a constant primary magnetostatic field $B_0$.

The MRI apparatus 10 also includes a gradient coil unit 13 that forms a gradient magnetic field in the imaging space 18 so as to provide the magnetic resonance signals received by the RF coil arrays with three-dimensional positional information. The gradient coil unit 13 includes three gradient coil systems, each of which generates a gradient magnetic field along one of three spatial axes perpendicular to each other, and generates a gradient field in each of a frequency encoding direction, a phase encoding direction, and a slice selection direction in accordance with the imaging condition. More specifically, the gradient coil unit 13 applies a gradient field in the slice selection direction (or scan direction) of the subject 16, to select the slice; and the RF body coil unit 15 or the local RF coil arrays may transmit an RF pulse to a selected slice of the subject 16. The gradient coil unit 13 also applies a gradient field in the phase encoding direction of the subject 16 to phase encode the magnetic resonance signals from the slice excited by the RF pulse. The gradient coil unit 13 then applies a gradient field in the frequency encoding direction of the subject 16 to frequency encode the magnetic resonance signals from the slice excited by the RF pulse.

The RF coil unit 14 is disposed, for example, to enclose the region to be imaged of the subject 16. In some examples, the RF coil unit 14 may be referred to as the surface coil or the receive coil. In the static magnetic field space or imaging space 18 where a static magnetic field $B_0$ is formed by the magnetostatic field magnet unit 12, the RF coil unit 15 transmits, based on a control signal from the controller unit 25, an RF pulse that is an electromagnet wave to the subject 16 and thereby generates a high-frequency magnetic field $B_1$. This excites a spin of protons in the slice to be imaged of the subject 16. The RF coil unit 14 receives, as a magnetic resonance signal, the electromagnetic wave generated when the proton spin thus excited in the slice to be imaged of the subject 16 returns into alignment with the initial magnetization vector. In some embodiments, the RF coil unit 14 may transmit the RF pulse and receive the MR signal. In other embodiments, the RF coil unit 14 may only be used for receiving the MR signals, but not transmitting the RF pulse.

The RF body coil unit 15 is disposed, for example, to enclose the imaging space 18, and produces RF magnetic field pulses orthogonal to the main magnetic field $B_0$ produced by the magnetostatic field magnet unit 12 within the imaging space 18 to excite the nuclei. In contrast to the RF coil unit 14, which may be disconnected from the MRI apparatus 10 and replaced with another RF coil unit, the RF body coil unit 15 is fixedly attached and connected to the MRI apparatus 10. Furthermore, whereas local coils such as the RF coil unit 14 can transmit to or receive signals from only a localized region of the subject 16, the RF body coil unit 15 generally has a larger coverage area. The RF body coil unit 15 may be used to transmit or receive signals to the whole body of the subject 16, for example. Using receive-only local coils and transmit body coils provides a uniform RF excitation and good image uniformity at the expense of high RF power deposited in the subject. For a transmit-receive local coil, the local coil provides the RF excitation to the region of interest and receives the MR signal, thereby decreasing the RF power deposited in the subject. It should be appreciated that the particular use of the RF coil unit 14 and/or the RF body coil unit 15 depends on the imaging application.

The T/R switch 20 can selectively electrically connect the RF body coil unit 15 to the data acquisition unit 24 when operating in receive mode, and to the RF driver unit 22 when operating in transmit mode. Similarly, the T/R switch 20 can selectively electrically connect the RF coil unit 14 to the data acquisition unit 24 when the RF coil unit 14 operates in receive mode, and to the RF driver unit 22 when operating in transmit mode. When the RF coil unit 14 and the RF body coil unit 15 are both used in a single scan, for example if the RF coil unit 14 is configured to receive MR signals and the RF body coil unit 15 is configured to transmit RF signals, then the T/R switch 20 may direct control signals from the RF driver unit 22 to the RF body coil unit 15 while directing received MR signals from the RF coil unit 14 to the data acquisition unit 24. The coils of the RF body coil unit 15 may be configured to operate in a transmit-only mode or a transmit-receive mode. The coils of the local RF coil unit 14 may be configured to operate in a transmit-receive mode or a receive-only mode.

The RF driver unit 22 includes a gate modulator (not shown), an RF power amplifier (not shown), and an RF oscillator (not shown) that are used to drive the RF coils (e.g., RF coil unit 15) and form a high-frequency magnetic field in the imaging space 18. The RF driver unit 22 modulates, based on a control signal from the controller unit 25 and using the gate modulator, the RF signal received from the RF oscillator into a signal of predetermined timing having a predetermined envelope. The RF signal modulated by the gate modulator is amplified by the RF power amplifier and then output to the RF coil unit 15.

The gradient coil driver unit 23 drives the gradient coil unit 13 based on a control signal from the controller unit 25 and thereby generates a gradient magnetic field in the imaging space 18. The gradient coil driver unit 23 includes three systems of driver circuits (not shown) corresponding to the three gradient coil systems included in the gradient coil unit 13.

The data acquisition unit 24 includes a pre-amplifier (not shown), a phase detector (not shown), and an analog/digital converter (not shown) used to acquire the magnetic resonance signals received by the RF coil unit 14. In the data acquisition unit 24, the phase detector phase detects, using the output from the RF oscillator of the RF driver unit 22 as a reference signal, the magnetic resonance signals received from the RF coil unit 14 and amplified by the pre-amplifier, and outputs the phase-detected analog magnetic resonance signals to the analog/digital converter for conversion into digital signals. The digital signals thus obtained are output to the data processing unit 31.

The MRI apparatus 10 includes a bed 26 for placing the subject 16 thereon. The subject 16 may be moved inside and outside the imaging space 18 by moving the bed 26 based on control signals from the controller unit 25.

The controller unit 25 includes a computer and a recording medium on which a program to be executed by the computer is recorded. The program when executed by the computer causes various parts of the apparatus to carry out operations corresponding to pre-determined scanning. The recording medium may comprise, for example, a ROM, flexible disk, hard disk, optical disk, magneto-optical disk, CD-ROM, or non-volatile memory card. The controller unit 25 is connected to the operating console unit 32 and processes the operation signals input to the operating console unit 32 and furthermore controls the bed 26, RF driver unit 22, gradient coil driver unit 23, and data acquisition unit 24 by outputting control signals to them. The controller unit 25 also controls, to obtain a desired image, the data processing unit 31 and the display unit 33 based on operation signals received from the operating console unit 32.

The operating console unit 32 includes user input devices such as a touchscreen, keyboard and a mouse. The operating console unit 32 is used by an operator, for example, to input such data as an imaging protocol and to set a region where an imaging sequence is to be executed. The data about the imaging protocol and the imaging sequence execution region are output to the controller unit 25.

The data processing unit 31 includes a computer and a recording medium on which a program to be executed by the computer to perform predetermined data processing is recorded. The data processing unit 31 is connected to the controller unit 25 and performs data processing based on control signals received from the controller unit 25. The data processing unit 31 is also connected to the data acquisition unit 24 and generates spectrum data by applying various image processing operations to the magnetic resonance signals output from the data acquisition unit 24.

In one example, the recording medium of the data processing unit 31 may include instructions for applying machine learning assisted MPR to the magnetic resonance signals to retrospectively reformat images. For example, a landmark plane determined via automatic scan plane prescription may be used to retrospectively reformat a diagnostic image sequence to produce a reformatted image sequence, and a trained image enhancement network may be configured to remove blur and artifacts from the reformatted images reconstructed from the diagnostic image sequence based on the landmark plane. Reliance on high-resolution diagnostic images may therefore be reduced, as the image enhancement network may learn anatomy and orientation specific filters for attenuating blur and reformatting specific artifacts from reformatted images. Further details of the machine learning assisted MPR provided below.

The display unit 33 includes a display device and displays an image on the display screen of the display device based on control signals received from the controller unit 25. The display unit 33 displays, for example, an image regarding an input item about which the operator inputs operation data from the operating console unit 32. The display unit 33 also displays a two-dimensional (2D) slice image or three-dimensional (3D) image of the subject 16 generated by the data processing unit 31.

Though a MRI system is described by way of example, it should be understood that the present techniques may also be useful when applied to images acquired using other imaging modalities, such as CT, tomosynthesis, PET, C-arm angiography, and so forth. The present discussion of an MRI imaging modality is provided merely as an example of one suitable imaging modality.

When the diagnostic image sequence acquired by an imaging system is reformatted along a plane other than that of the plane used to acquire the original diagnostic images, and displayed at a display device, artifacts and blur may be observed in the reformatted image sequence. The artifacts may be attributable to step edges in the diagnostic image sequence, while the blur may be caused by motion of an imaging subject. In some examples, efforts to mitigate a presence of image artifacts may include acquiring the diagnostic image sequence at high-resolution, which may demand prolonged scan times and exacerbate contrast changes.

In one example, as described herein, resolution enhanced reformatted images (e.g., images with attenuated artifacts or blur, and of higher spatial resolution than conventionally reformatted image sequences) may be obtained without increasing scan times via a workflow that utilizes deep learning to intelligently remove and enhance the resolution of reformatted image sequences, based on the plane used to perform the reformatting. The workflow may include reformatting the diagnostic image sequence according to a specific landmark plane, along with target specifications, such as output resolution and thickness. The reformatted images may be processed using a trained image enhancement network to remove the blur and artifacts. For example, the image enhancement network may be trained to identify the blur according to different plane orientations predicted by automated scan plane prescription.

Figure 2:
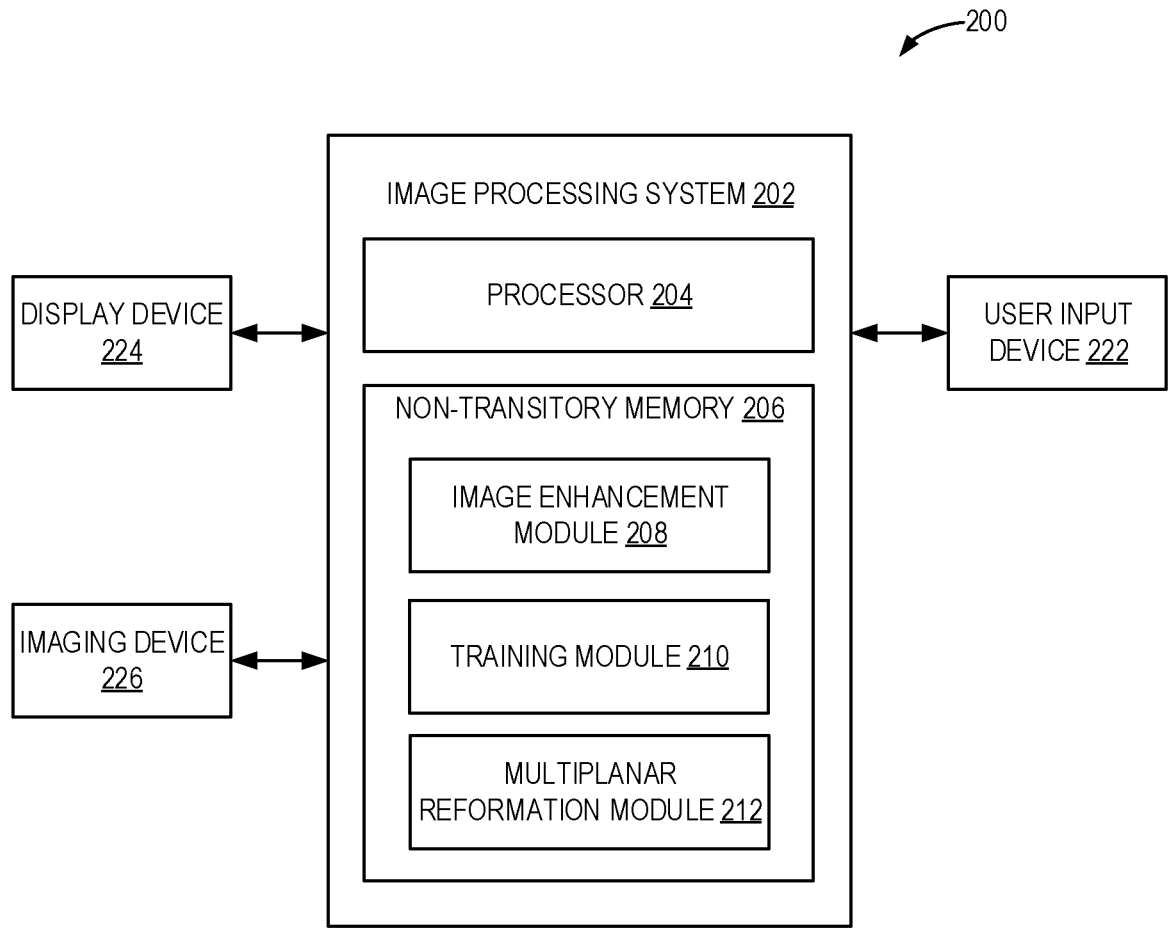
FIG. 2 is a block diagram of an imaging system according to an embodiment of the disclosure.

Referring to FIG. 2, an imaging system 200 is shown. Imaging system 200 may be configured to acquire 3D medical images of an imaging subject using an imaging device 226, and process the acquired 3D images using image processing system 202, e.g., by reformatting the 3D images along a plane of interest. The processed images may be displayed to a user via display device 224. User input may be received by the imaging system via user input device 222, wherein one or more of image acquisition and image processing may be adjusted based on the user input received. As an example, following a 3D image acquisition, a user may specify a pre-determined anatomical region of interest for which the user wishes to view one or more standard views. The image processing system 202 may receive the user input from the user input device 222 and reformat the 3D image along one or more standard orientations/planes according to machine executable instructions stored in multiplanar reformation (MPR) module 212, to produce the requested standard views of the anatomical region of interest. Further, the image processing system may post-process the standard views of the anatomical region of interest, using a trained image enhancement network stored in image enhancement module 208, to produce resolution enhanced standard views. The post-processed standard views of the anatomical region of interest may be of greater resolution than the originally acquired 3D image, and may display a reduced number and severity of blur and reformat artifacts as compared to conventional MPR approaches, thereby enabling a user to view the anatomical regions of interest in greater detail than may be possible using conventional approaches. In some embodiments, the image processing system 202 may be further configured to train the image enhancement network, by executing instructions stored in training module 210, as will be described in more detail with reference to FIGS. 3-8.

In some embodiments, at least a portion of image processing system 202 is disposed at a device (e.g., edge device, server, etc.) communicably coupled to the MRI system 10 via wired and/or wireless connections. In some embodiments, at least a portion of image processing system 202 is disposed at a separate device (e.g., a workstation) which can receive images from the MRI system or from a storage device which stores the images/data generated by the MRI system. Image processing system 202 may be operably/communicatively coupled to user input device 222 and a display device 224. User input device 222 may be integrated into an MRI system, such as at operating console unit 32 of the MRI system 10. Similarly, display device 224 may be integrated into an MRI system, such as at display unit 33 of MRI system 10.

Image processing system 202 includes a processor 204 configured to execute machine readable instructions stored in non-transitory memory 206. Processor 204 may be single core or multi-core, and the programs executed thereon may be configured for parallel or distributed processing. In some embodiments, processor 204 may optionally include individual components that are distributed throughout two or more devices, which may be remotely located and/or configured for coordinated processing. In some embodiments, one or more aspects of processor 204 may be virtualized and executed by remotely-accessible networked computing devices configured in a cloud computing configuration.

Non-transitory memory 206 may store the image enhancement module 208, the training module 210, and the MPR module 212. The image enhancement module 208 may include parameters of one or more image enhancement networks, along with instructions for processing data via the image enhancement networks. In one example, the image enhancement module 208 may include a ML model trained to map a reformatted image sequence, a landmark plane/plane of interest used to produce the reformatted image sequence, and an originally acquired image sequence (that is, an image sequence before an MPR process is conducted) to a resolution enhanced image sequence corresponding to the reformatted image sequence. Image enhancement networks stored in image enhancement module 208 may include trained and/or untrained machine learning (ML) models, and may further include various data, or metadata pertaining to the one or more ML models stored therein.

Non-transitory memory 206 may further store a training module 210, which may comprise instructions for training one or more of the image enhancement networks stored in image enhancement module 208. Training module 210 may include instructions that, when executed by processor 204, cause image processing system 202 to conduct one or more of the steps of method 700 for training an image enhancement network to map reformatted image sequences to resolution enhanced image sequences, wherein the resolution enhanced image sequence may have a greater resolution than the input reformatted image sequence, and may show attenuation of blur and/or image artifacts present in the input reformatted image sequence. In some embodiments, training module 210 may include instructions for implementing one or more gradient descent algorithms, applying one or more loss functions, and/or training routines, for use in adjusting parameters of one or more neural networks of image enhancement module 208. Training module 210 may include training datasets for the one or more image enhancement networks of image enhancement module 208, and may further include instructions for generating said training data from 3D images/image sequences, according to one or more of the methods disclosed herein.

Non-transitory memory 206 also stores MPR module 212, which may include instructions for executing one or more MPR algorithms known in the art of medical imaging, and may include resampling of image data from an image sequence along a landmark plane or other plane of interest. In some embodiments, the MPR module 212 may stack the image data from an image sequence acquired via imaging device 226, or received via communicative coupling with a remotely located imaging device and/or image storage system, and re-slice the image data along the landmark plane or plane of interest. In some embodiments, the MPR module 212 may be configured to receive an automatically determined landmark plane (e.g., a landmark plane produced by a landmark plane segmentation model based on three-plane localizer images), and automatically retrospectively reformat an image sequence along the landmark plane, thereby expediting generation of standard views of an anatomically region of interest.

In some embodiments, non-transitory memory 206 may include components disposed at two or more devices, which may be remotely located and/or configured for coordinated processing. In some embodiments, one or more aspects of non-transitory memory 206 may include remotely-accessible networked storage devices configured in a cloud computing configuration.

User input device 222 may comprise one or more of a touchscreen, a keyboard, a mouse, a trackpad, a motion sensing camera, or other device configured to enable a user to interact with and manipulate data within image processing system 202. In one example, user input device 222 may enable a user to make a selection of a landmark plane/plane of interest with respect to an image sequence, and/or to provide MPR settings such as slice number, slice thickness, slice spacing etc.

Display device 224 may include one or more display devices utilizing virtually any type of technology. In some embodiments, display device 224 may comprise a computer monitor, and may display medical images, such as resolution enhanced images produced according to one or more of the methods disclosed herein. Display device 224 may be combined with processor 204, non-transitory memory 206, and/or user input device 222 in a shared enclosure, or may be peripheral display devices and may comprise a monitor, touchscreen, projector, or other display device known in the art, which may enable a user to view MRIs produced by an MRI system, and/or interact with various data stored in non-transitory memory 206.

It should be understood that imaging system 200 shown in FIG. 2 is for illustration, not for limitation. Another appropriate imaging system may include more, fewer, or different components.

Figure 3:
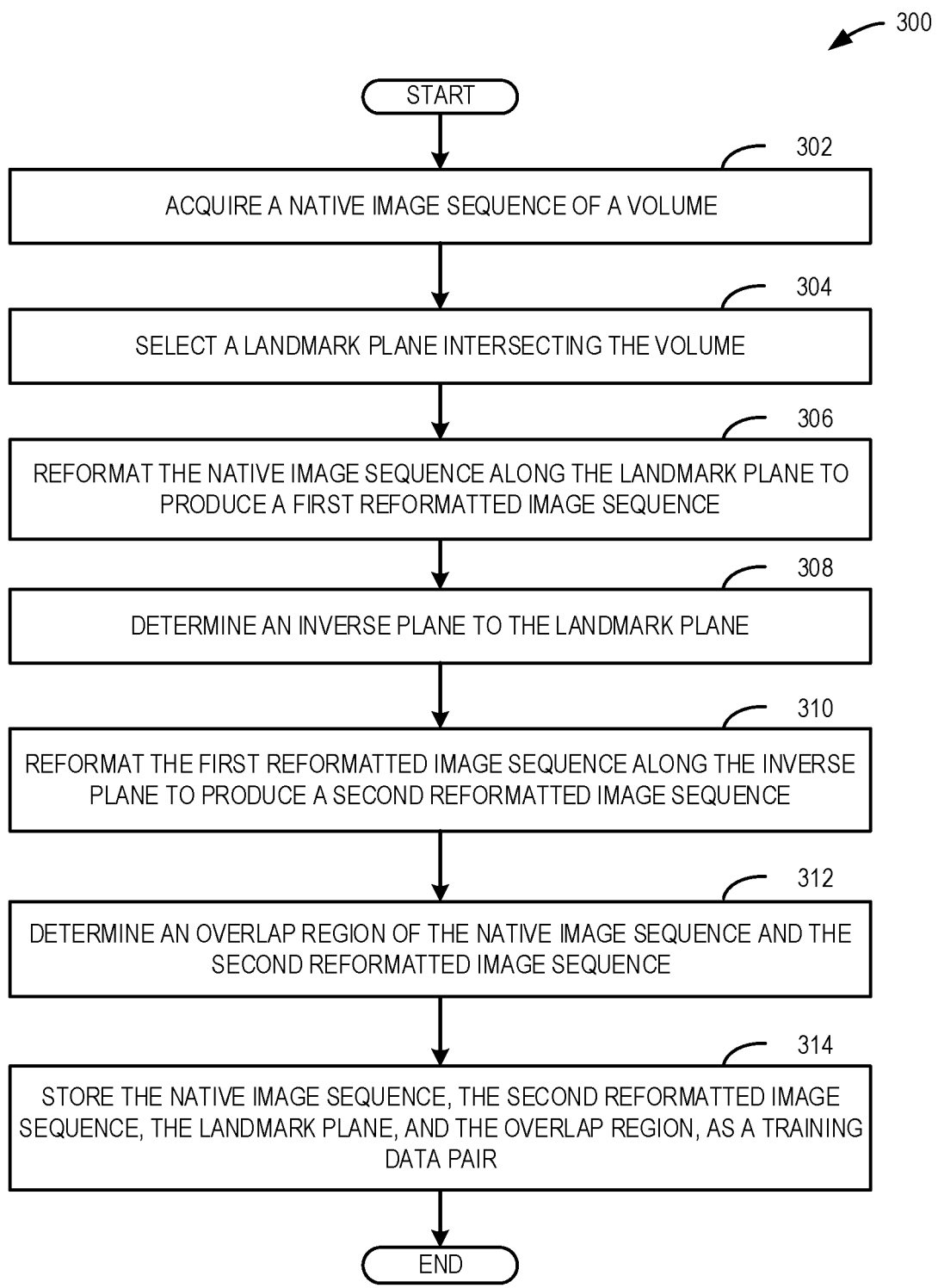
FIG. 3 is a flowchart of a first method for generating training data for an image enhancement network, according to an embodiment of the disclosure.

Referring to FIG. 3, a first embodiment of a method 300 for generating training data for training an image enhancement network is shown. The training data generated by method 300 may be employed to train an image enhancement network to learn to intelligently remove blur artifacts and enhance the resolution of reformatted image sequences, based on the plane used to perform the reformatting. In some embodiments, method 300 may be executed by an imaging system, such as imaging system 200, shown in FIG. 2.

Method 300 begins at operation 302, wherein the imaging system acquires a native image sequence of a volume, wherein the native image sequence comprises a first plurality of 2D images parallel to a first plane. In some embodiments, the first plane may be one of a pre-determined number of planes (e.g., coronal, sagittal, or axial) with respect to an imaging subject. In other embodiments, the native image sequence may be approximately parallel to a landmark plane, but with a deviation from the landmark plane due to motion of the imaging subject, or inaccuracy of landmark plane segmentation. In some embodiments, the native image sequence may be of 0.25 mm isotropic resolution.

At operation 304, the imaging system selects a pre-determined landmark plane intersecting the volume. In some embodiments, the landmark plane may be determined based on three-plane localizer images of the volume, using a landmark plane segmentation model, wherein the landmark plane intersects a pre-determined anatomical region. The landmark plane segmentation model may comprise a deep learning model configured to receive the three-plane localizer images as input features, and output one or more landmark planes (also referred to herein as planes of interest). In some embodiments, the landmark plane segmentation model comprises one or more learned convolutional filters. In some embodiments, multiple landmark planes may be determined, and thus at operation 304 one of the multiple landmark planes may be selected. In some embodiments, an image enhancement network trained using training data generated by method 300 may be used in conjunction with the same or a substantially similar landmark plane segmentation model as used at operation 304, thus ensuring landmark planes fed to the image enhancement network at inference time are substantially similar to those used during training of the image enhancement network.

At operation 306, the imaging system reformats the native image sequence along the landmark plane to produce a first reformatted image sequence comprising a second plurality of 2D images parallel to the landmark plane. Image reformatting may be performed using one or more MPR algorithms known in the art of medical imaging, and may include resampling of image data from the image sequence acquired at operation 302 along the landmark plane. In some embodiments, MPR may be performed by "stacking" the image data from the native image sequence acquired at operation 302 and re-slicing the image data along the landmark plane. In some embodiments, additional parameters such as slice thickness, and slice spacing, may be provided, thereby enabling re-slicing of the native image sequence using a specified thickness and slice separation.

At operation 308, the imaging system determines an inverse plane to the landmark plane. In some embodiments, the imaging system may determine the inverse plane by determining a set of transformations which map from the landmark plane to the first plane. In some embodiments, the inverse plane may be determined by determining the inverse affine transform of the first MPR transformation performed at operation 306.

At operation 310, the imaging system reformats the first reformatted image sequence along the inverse plane to produce a second reformatted image sequence comprising a third plurality of 2D images parallel to the inverse plane (and also parallel to the first plane). Image reformatting may be performed using one or more MPR algorithms known in the art of medical imaging, and may include resampling of image data from the first reformatted image sequence produced at operation 306 along the inverse plane. In some embodiments, MPR may be performed by "stacking" the image data from the first reformatted image sequence produced at operation 306 and re-slicing the image data along the inverse plane. In one embodiment, the image reformatting process may involve the use of interpolation techniques. For instance, nearest-neighbor interpolation, linear interpolation, or cubic convolution interpolation may be employed to estimate the pixel values in the second reformatted image sequence.

At operation 312, the imaging system determines an overlap of foreground regions of the native image sequence with foreground regions of the second reformatted image sequence based on the intersection of the second reformatted image sequence foreground and the native image sequence foreground. As 2D images comprising the second reformatted image sequence are in a same orientation as 2D images from the native image sequence, determining regions of overlap between anatomical regions/foreground is computationally efficient.

At operation 314, the imaging system stores the native image sequence, the second reformatted image sequence, the landmark plane, and the overlap region, as a training data pair. In particular, the native image sequence, the second reformatted image sequence, and, the landmark plane, are stored as input data/input features, while the overlap region is stored as the ground truth image sequence. Following operation 314, method 300 may end.

Figure 4:
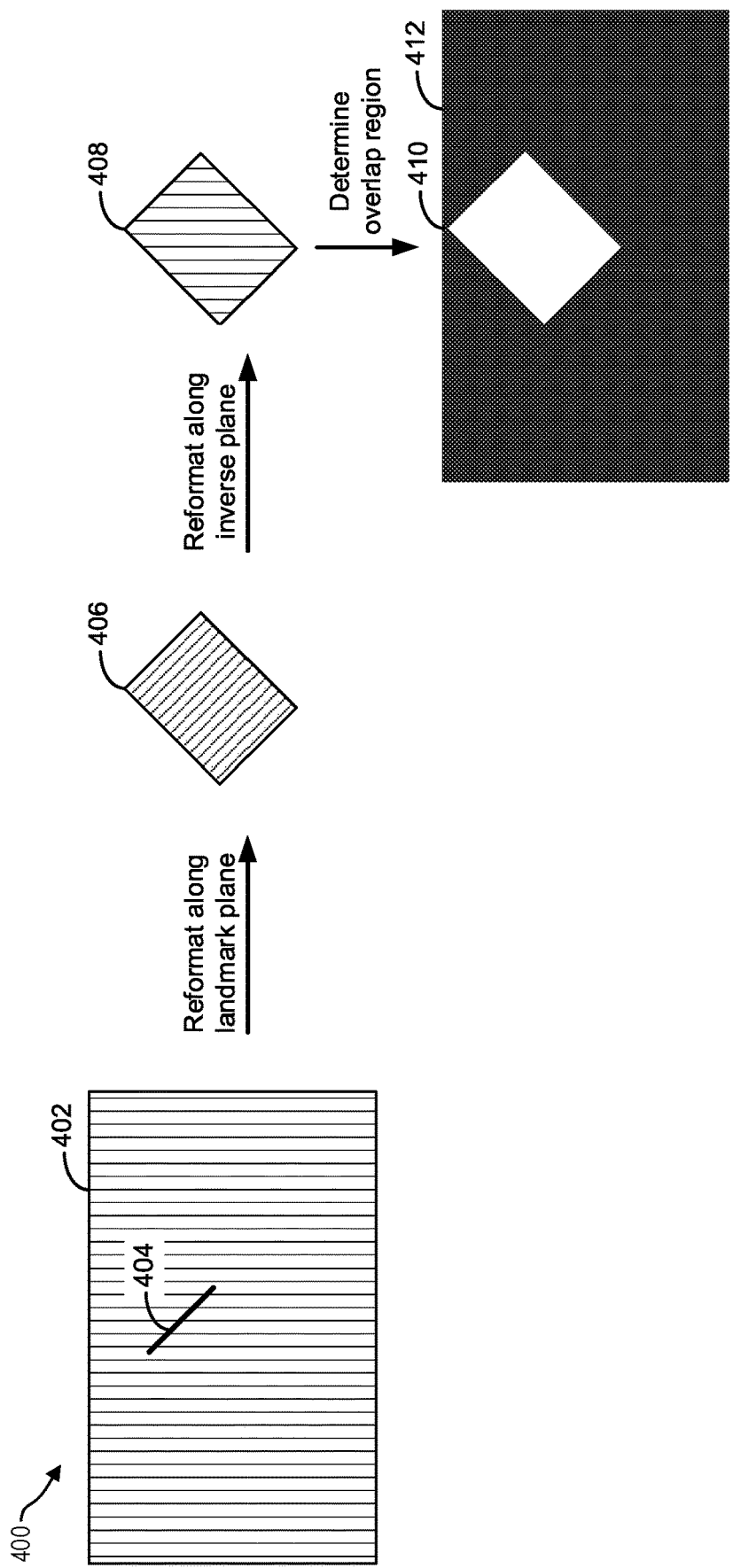
FIG. 4 is a diagram illustrating the first method for generating training data for an image enhancement network, according to an embodiment of the disclosure.

Referring now to FIG. 4, an illustration 400 of the training data generation method 300, is shown. Illustration 400 includes a native image sequence 402, overlaid by a landmark plane 404. As can be seen in FIG. 4, the native image sequence 402 comprises a plurality of 2D images having a first orientation (i.e., parallel to a first plane). The landmark plane 404 is not parallel to the plurality of 2D images comprising the native image sequence 402, as the landmark plane 404 intersects 2D images of the native image sequence 402.

Reformation of the native image sequence 402 along the landmark plane 404 (as described above at operation 306, above) produces a first reformatted image sequence 406, comprising a plurality of 2D images parallel to the landmark plane 404, and not parallel to the plurality of 2D images comprising the native image sequence 402. Reformation of the first reformatted image sequence 406 along the inverse plane (as described at operation 310, above), produces a second reformatted image sequence 408, wherein the second reformatted image sequence 408 comprises a plurality of 2D images parallel to the plurality of 2D images of the native image sequence 402. By reformatting the first reformatted image sequence 406 along an inverse plane to the landmark plane 404. 2D images of the second reformatted image sequence will be more easily registered to the native image sequence 402.

The region of overlap 410 may be determined, wherein the region of overlap 410 comprises the light portion of intersection mask 412. The region of overlap 410 includes a region of the native image sequence 402 equivalent to the region captured by the second reformatted image sequence 408, and thus may serve as a ground truth image sequence to train an image enhancement network a mapping from an image space with reformation artifacts and blur (e.g., an image space embodied by the second reformatted image sequence) to a high-resolution image space devoid of blur and reformation artifacts.

Figure 5:
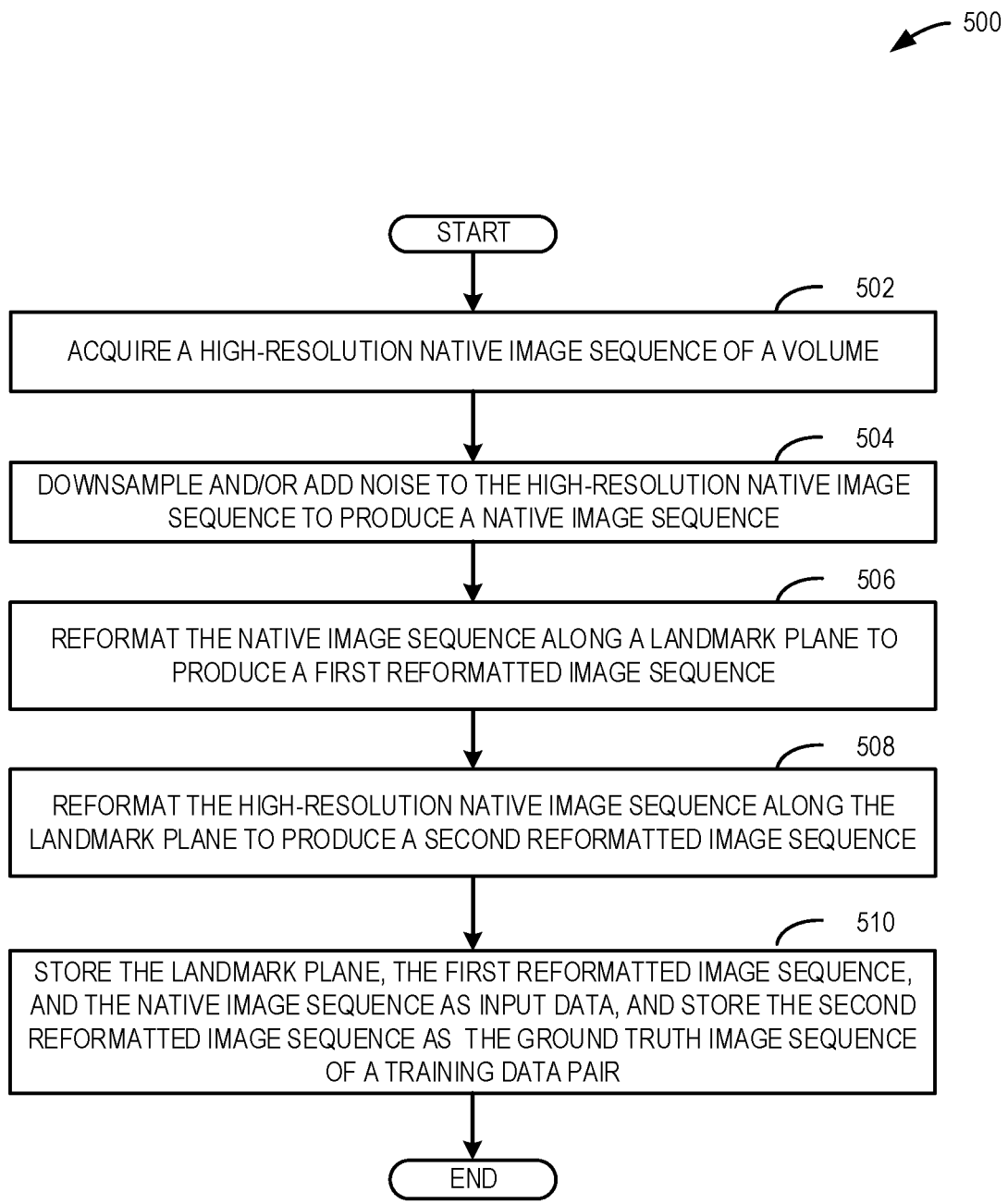
FIG. 5 is a flowchart of a second method for generating training data for an image enhancement network, according to an embodiment of the disclosure.

Referring to FIG. 5, a second embodiment of a method 500 for generating training data for an image enhancement network is shown. The training data generated by method 500 may be employed to train an image enhancement network to learn to intelligently remove and enhance the resolution of reformatted image sequences, based on the plane used to perform the reformatting. In some embodiments, method 500 may be executed by an imaging system, such as imaging system 200, shown in FIG. 2.

Method 500 begins at operation 502, wherein the imaging system acquires a high-resolution native image sequence of a volume. The high-resolution native image sequence comprises a first plurality of 2D images parallel to a first plane. In some embodiments, the first plane may be one of a pre-determined number of planes (e.g., coronal, sagittal, or axial) with respect to an imaging subject. In other embodiments, the high-resolution native image sequence may be approximately parallel to a landmark plane, but with a deviation from the landmark plane due to motion of the imaging subject, or inaccuracy of landmark plane segmentation. In some embodiments, the high-resolution native image sequence may be of 0.25 mm isotropic resolution.

At operation 504, the imaging system downsamples and/or adds noise to the high-resolution native image sequence to produce a low-resolution native image sequence (referred to simply as a native image sequence hereafter). In some embodiments, the imaging system may downsample the high-resolution native image sequence both by downsampling within 2D images comprising the high-resolution native image sequence, and by dropping or combining 2D images/slices of the high-resolution native image sequence, thereby downsampling the high-resolution image sequence along all three dimensions of the imaging data. In some embodiments, downsampling may comprise one or more of decimation: wherein every other row, column, and slice of the high-resolution native image sequence is dropped; max-pooling: wherein the single greatest voxel intensity value in a patch of voxels of pre-determined size is used to substitute for patch of voxels; bilinear interpolation: wherein a weighted average of the eight nearest voxels is used to generate a new voxel value; cubic interpolation: wherein a weighted average of the 64 nearest voxels is used to generate a new voxel value; and nearest neighbor interpolation: wherein the nearest voxel is selected to generate a new voxel value. The native image sequence is of lower spatial resolution than the high-resolution native image sequence, and thus approximates image sequences which may be acquired at inference time, when image acquisition time may be limited.

Additionally, at operation 504, the imaging system may add noise to the downsampled, native image sequence, thereby providing a further mechanism of image quality adjustment, which may both increase the variety of training data produced (e.g., by adjusting the amount of noise added), and may more closely approximate image sequences likely to be encountered at inference time (e.g., when the image enhancement network is deployed at an imaging center or hospital). In some embodiments, the imaging system may add gaussian noise to the low-resolution native image sequence by adding random values from a Gaussian distribution to each voxel in the low-resolution native image sequence. In some embodiments, the imaging system may add white Gaussian noise to the low-resolution native image sequence by adding random values from a normal distribution to each voxel in the low-resolution native image sequence. In another embodiment, the imaging system may add Rician noise to the low-resolution native image sequence by combining both Gaussian noise and noise due to the random phase of the MRI signal to the voxels of the low-resolution native image sequence.

At operation 506, the imaging system reformats the native image sequence along a landmark plane to produce a first reformatted image sequence comprising a first plurality of 2D images parallel to the landmark plane. The reformation process of the native image sequence may introduce blur and reformation imaging artifacts into the first reformatted image sequence, thus mimicking a reformatted image sequence likely to be encountered at inference time, as reformation blur and artifacts are a function of the resolution of the image data being reformatted, wherein lower resolution imaging data produces more or more sever reformation imaging artifacts. Image reformatting may be performed using one or more MPR algorithms known in the art of medical imaging, and may include resampling of image data from the native image sequence along the landmark plane. In some embodiments, MPR may be performed by "stacking" the image data from the native image sequence and re-slicing the image data along the landmark plane.

At operation 508, the imaging system reformats the high-resolution native image sequence along the landmark plane to produce a second reformatted image sequence comprising a second plurality of 2D images parallel to the landmark plane. The reformation process of the high-resolution native image sequence may introduce little or no blur or reformation imaging artifacts into the second reformatted image sequence, as the degree of blur and artifacts introduced by MPR is inversely proportional to the resolution of the imaging data being reformatted. Thus, the second reformatted image sequence is a higher resolution version of the first reformatted image sequence, and may include attenuated or no reformation artifacts, thereby enabling the second reformatted image sequence to serve as a ground truth high-resolution image sequence. Image reformatting may be performed using one or more MPR algorithms known in the art of medical imaging, and may include resampling of image data from the high-resolution image sequence along the landmark plane. In some embodiments, MPR may be performed by "stacking" the image data from the high-resolution image sequence and re-slicing the image data along the landmark plane.

At operation 510, the imaging system stores the landmark plane, the first reformatted image sequence, and the native image sequence as input data, and stores the second reformatted image sequence as a corresponding ground truth image sequence of a training data pair. In one embodiment, the imaging system may also store additional parameters or metadata associated with the image sequences in association with the training data pair. For instance, the system may store information such as the imaging modality used (e.g., MRI, CT, ultrasound), the patient's demographic information, or the specific settings used during image acquisition. This additional information could be used to train an image enhancement network to adapt to variations in imaging modality or patient characteristics. In another embodiment, the imaging system may store multiple landmark planes and corresponding reformatted image sequences generated from a same high-resolution native image sequence as distinct training data pairs. The multiple landmark planes may be derived from different anatomical regions captured by the high-resolution native image sequence, providing a more diverse set of training data. Following operation 510, method 500 may end.

Referring now to FIG. 6, an illustration 600 of the training data generation method 500, is shown. Illustration 600 includes a high-resolution native image sequence 602, overlaid with a landmark plane 604. As can be seen in FIG. 6, the high-resolution native image sequence 602 comprises a plurality of 2D images having a first orientation (i.e., parallel to a first plane). The landmark plane 604 is not parallel to the plurality of 2D images comprising the high-resolution native image sequence 602, as the landmark plane 604 intersects 2D images of the high-resolution native image sequence 602.

Downsampling of the high-resolution native image sequence 602 produces low-resolution native image sequence 606, which comprises a plurality of 2D images also parallel to the first plane. The landmark plane 604 is also shown overlaid on the low-resolution native image sequence 606. MPR of the low-resolution native image sequence 606 along the landmark plane 604 produces the first reformatted image sequence 612, which comprises a plurality of 2D images parallel to the landmark plane 604. The first reformatted image sequence 612 may include reformation artifacts, as it is derived from low-resolution native image sequence 606, and the prevalence of reformation artifacts is inversely correlated with the resolution of the imaging data being reformatted.

MPR of the high-resolution native image sequence 602 along the landmark plane 604 produces a second reformatted image sequence 610 comprising a second plurality of 2D images parallel to the landmark plane 604. The reformation process of the high-resolution native image sequence 602 may introduce little or no blur or reformation artifacts into the second reformatted image sequence 610, as the degree of blur and artifacts introduced by MPR is inversely proportional to the resolution of the imaging data being reformatted. Thus, the second reformatted image sequence 610 is a higher resolution version of the first reformatted image sequence 612, and may include attenuated or no reformation artifacts, thereby enabling the second reformatted image sequence 610 to serve as a ground truth high-resolution image sequence.

Referring to FIG. 7, a method 700 of training an image enhancement network to selectively denoise and enhance resolution of reformatted image sequences, based on the plane used to produce the reformatted image sequence, is shown. Method 700 may be executed by an imaging system, such as imaging system 200, shown in FIG. 2. Method 700 may be performed to train an image enhancement network, such as the image enhancement network employed in method 900, using training data generated via methods 300 and/or 500.

Method 700 begins at operation 702, wherein the imaging system selects a training data pair comprising input data (comprising a plane, a reformatted image sequence, and a native image sequence), and a ground truth image sequence. The reformatted image sequence is produced by reformatting the data of the native image sequence along the plane, or in some embodiments, by reformatting the native image sequence along a perturbed version of the plane. The reformatted image sequence may include blur and/or reformation artifacts such as step edges, which may be produced by MPR. Said another way, the input data comprises a pre-reformat image sequence (the native image sequence), a post reformat image sequence (the reformatted image sequence), and the plane used to perform the reformatting. The ground truth image sequence is a high-resolution image sequence capturing a same volume/imaging subject as the reformatted image sequence, but at a higher spatial resolution, and with attenuated or no reformation induced imaging artifacts. In some embodiments, the orientation of the 2D images comprising the ground truth image sequence may be the same as the 2D images of the reformatted image sequence, with respect to the imaging volume/imaging subject.

At operation 704, the imaging system maps the input data to a predicted resolution enhanced image sequence using an image enhancement network. In some embodiments, the image enhancement network includes a plurality of 3D convolutional filters, wherein the plurality of 3D convolutional filters receive spatially contiguous data from spatially corresponding sub-regions of both the reformatted image sequence and the native image sequence, or from a subsequently produced 3D feature map. The image enhancement network may comprise one or more convolutional layers, comprising one or more 3D convolutional filters. The 3D convolutional filters may be used to detect features in the reformatted image sequence and the native image sequence, such as edges, corners, and shapes. In some embodiments, the plurality of 3D convolutional filters are convolved with the reformatted image sequence and the native image sequence to detect features, which may be output as a feature map. The filters of the image enhancement network may be further configured to receive the plane as an additional feature channel of the input data, e.g., by encoding the plane as a numerical value or vector, and concatenating the numerical value or vector to each voxel of the reformatted image sequence or the native image sequence. In some embodiments, plane information may be provided to the image enhancement network as a 3D binary matrix corresponding to the reformatting/landmark plane parameters.

The predicted resolution enhanced image sequence comprises a plurality of 2D images corresponding to the reformatted image sequence, wherein each of the plurality of 2D images is parallel to the plane. In some embodiments, there may be a one-to-one correspondence between 2D images of the reformatted image sequence and the predicted resolution enhanced image sequence (e.g., for a first image of the reformatted image sequence, there may be exactly one corresponding image in the predicted resolution enhanced image sequence which captures the same, or substantially similar anatomical features).

At operation 706, the imaging system determines a loss based on the predicted resolution enhanced image sequence and the ground truth high-resolution image sequence. In some embodiments, differences in spatially corresponding voxel intensity values between the predicted resolution enhanced image sequence and the ground truth high-resolution image sequence may be used to determine the loss. In some embodiments, the loss function may comprise a mean squared error (MSE) loss function, wherein the average squared difference between the predicted and ground truth voxel values is used as the loss for the current prediction of the image enhancement network. In Another embodiment, the loss function may comprise a mean absolute error (MAE) loss function, wherein the average absolute difference between the predicted and ground truth voxel values is used as the loss for the current prediction of the image enhancement network. The above two loss functions are provided as non-limiting examples, and it will be appreciated that the current disclosure encompasses use of other loss functions known in the art of image processing and deep learning.

At operation 708, the imaging system adjusts weights and biases of the image enhancement network based on the loss. In some embodiments, the parameters of the image enhancement network, may be adjusted to reduce the loss over a training data set. In some embodiments, back propagation of the loss may occur according to a gradient descent algorithm, wherein a gradient of the loss function (a first derivative, or approximation of the first derivative) is determined for each weight and bias of the image enhancement network. Each weight (and bias) of the image enhancement network is then updated by adding the negative of the product of the gradient determined (or approximated) for the weight (or bias) with a predetermined step size. Following operation 708, method 700 may end.

It will be noted that method 700 may be repeated for each of a plurality of training data pairs in a training data set, and this process may be repeated until a stop condition is met. Wherein, in some embodiments, the stop condition comprises one or more of the loss decreasing to below a threshold loss, a rate of loss change decreasing to below a threshold rate of loss change, a validation loss, determined over a validation data set, reaching a minimum, etc.

Referring to FIG. 8, an illustration 800 of the training method 700 is shown. As can be seen, input data of a training data pair, comprising a reformatted image sequence 802, a native image sequence 804, and a landmark plane 806, are fed to an image enhancement network 808. The image enhancement network 808 maps the input data to a predicted resolution enhanced image sequence 810, and a loss 816 is determined for the predicted resolution enhanced image sequence 810 based on a difference between a ground truth high resolution image sequence 812 and the predicted resolution enhanced image sequence 810. Once determined, the loss 816 is back propagated through the image enhancement network 808 and used to update parameter values of the image enhancement network.

Figure 9:
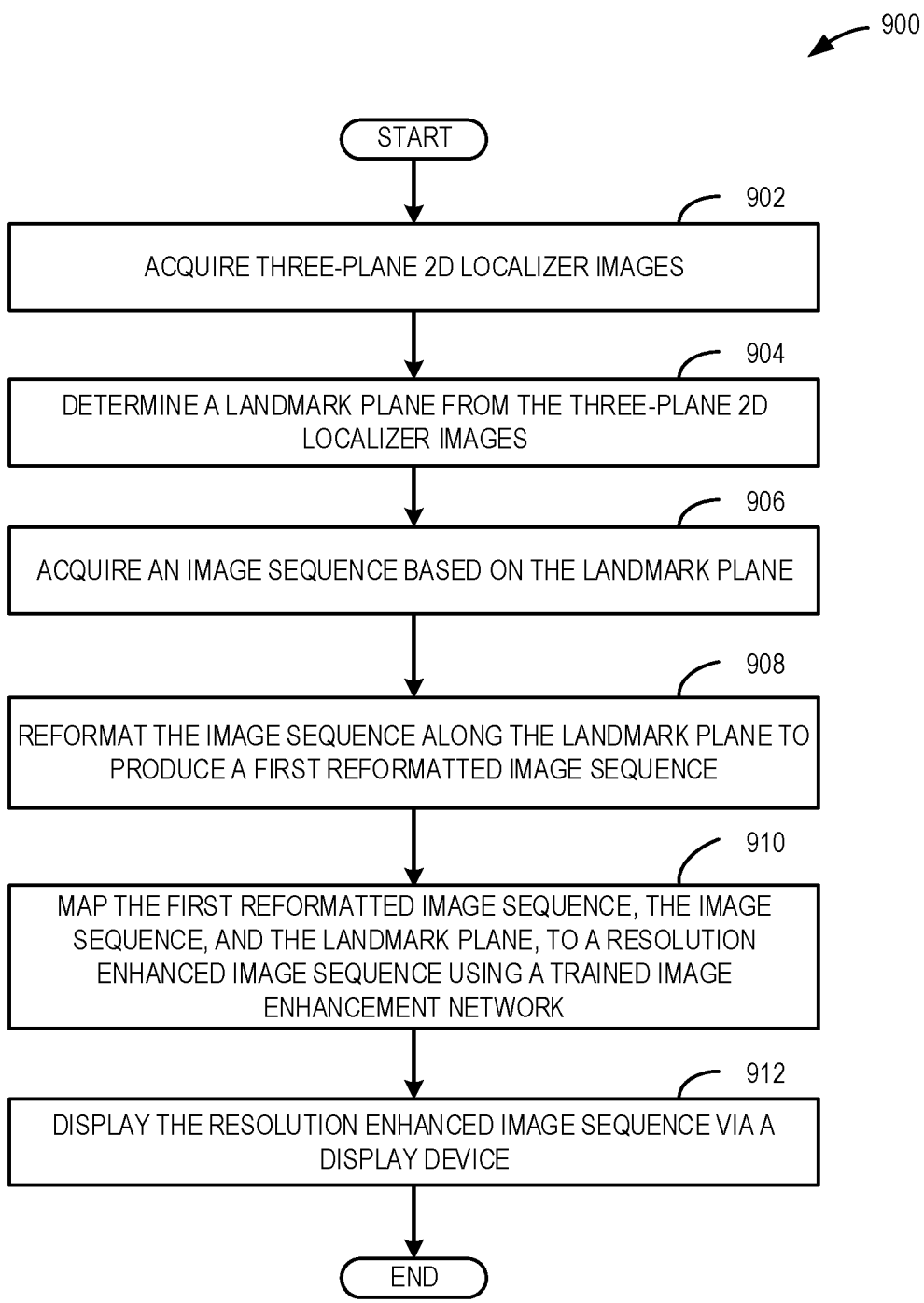
FIG. 9 is a flowchart of a first embodiment of a method for performing retrospective reconstruction of an image sequence using a trained image enhancement network, according to an embodiment of the disclosure.
Figure 10:
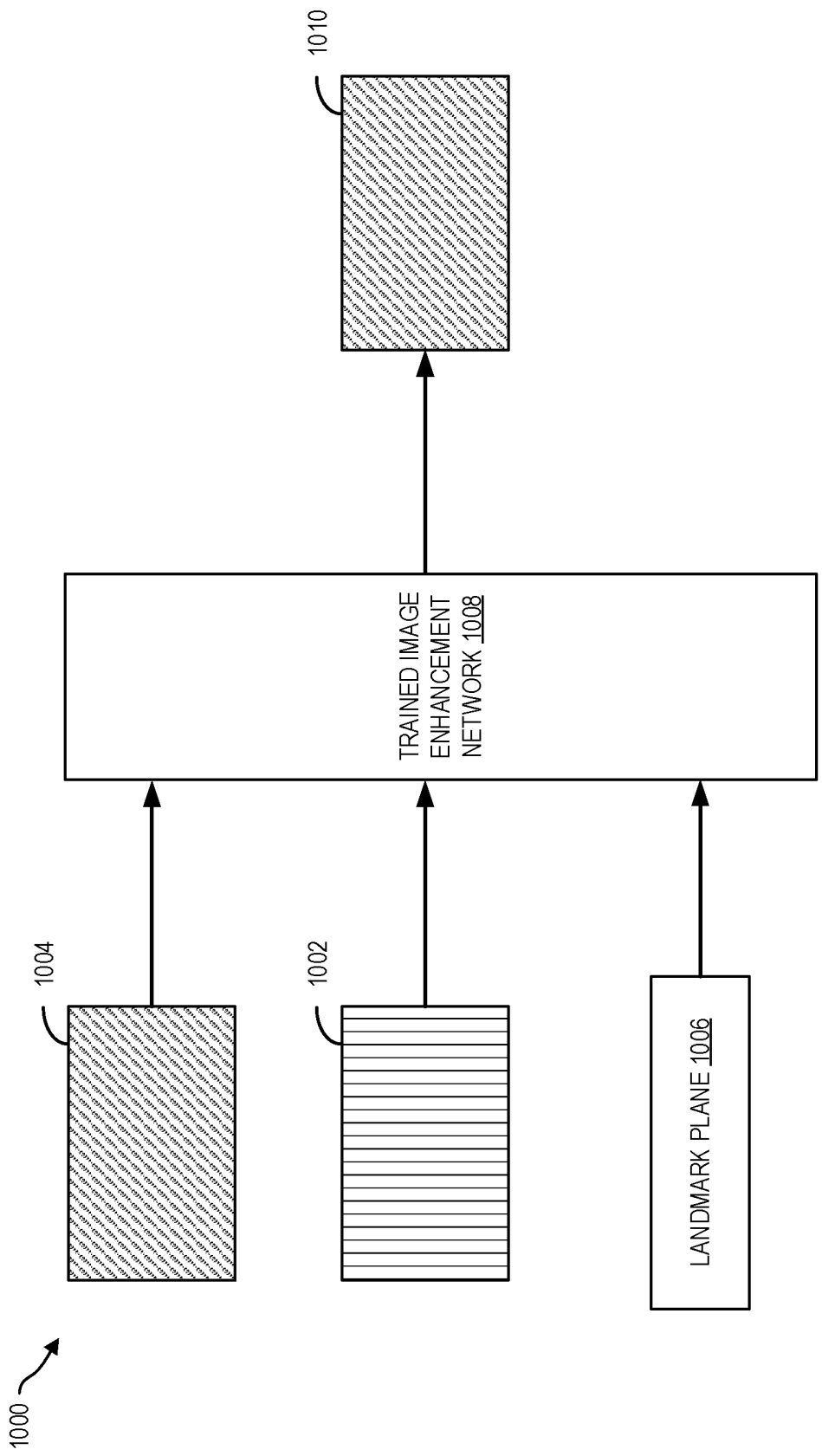
FIG. 10 is a diagram illustrating the first embodiment of the method for performing retrospective reconstruction of an image sequence using a trained image enhancement network, according to an embodiment of the disclosure.

Referring to FIG. 9, a first embodiment of a method 900 for performing machine learning assisted MPR of an image sequence using a trained image enhancement network is shown. Method 900 may be performed by an imaging system, such as imaging system 200 shown in FIG. 2, using a trained image enhancement network, such as the image enhancement network trained using method 700 shown in FIG. 7, with training data produced by one or more of methods 300 and/or 500.

Method 900 begins at operation 902, wherein the imaging system acquires three-plane localizer images of a volume. Three-plane localizer images are 2D images which provide a three-dimensional view of the volume to be imaged. In some embodiments, three-plane localizer images are taken from the axial, sagittal, and coronal planes, which are perpendicular to each other. Three-plane localizer images may be used to plan a diagnostic scan by providing a comprehensive view of the volume to be imaged (e.g., a body of the imaging subject). The three-plane localizer images may be used to identify a location of an area of interest, as well as the size and shape of the area of interest. This information can then be used to determine scanning parameters for the diagnostic scan, such as the type of scan, the angle of the scan, and the number of slices to be taken, and the slice thickness. The three-plane localizer images may also be used to identify potential obstacles that may interfere with the scan, such as bones, organs, or implants.

At operation 904, the imaging system determines a landmark plane from the three-plane localizer images. In some embodiments, the landmark plane is determined based on three-plane localizer images of the volume, using a landmark plane segmentation model, wherein the landmark plane intersects a pre-determined anatomical region. The landmark plane segmentation model may comprise a deep learning model configured to receive the three-plane localizer images as input features, and output one or more landmark planes (also referred to herein as planes of interest). In some embodiments, the landmark plane segmentation model comprises one or more learned convolutional filters. In some embodiments, at operation 904, multiple landmark planes may be determined. As an example, a diagnostic scan may capture an anatomical region of interest, and operation 904 may include determining multiple planes which capture standard views of the anatomical region of interest, wherein the standard views may include more than one orientation of the anatomical region of interest (e.g., acquiring both a sagittal and coronal view of the same anatomical region of interest). In another example, a diagnostic scan may capture multiple anatomical regions of interest, wherein at operation 904 the imaging system may determine at least one landmark plane for each anatomical region of interest, wherein the landmark planes capture the respective anatomical regions of interest in one or more standard views.

At operation 906, the imaging system acquires an image sequence based on the landmark plane. The image sequence comprises a plurality of 2D images, wherein each of the plurality of 2D images is parallel to a first plane, and wherein the landmark plane is not parallel the first plane. The image sequence acquired at operation 906 may be referred to as a native image sequence, as the plurality of 2D images comprising the image sequence have not been reformatted. In the trivial case, the first plane (that is, the orientation of the images of the diagnostic scan) is parallel to the landmark plane, and therefore the image sequence may include the desired standard view of the anatomical region of interest, however, in most cases the diagnostic imaging sequence is not parallel to the landmark plane, or if there are multiple non-parallel landmark planes, the imaging sequence may not be parallel to all of the landmark planes, thus necessitating retrospective MPR. It is the non-trivial case of retrospective MPR to which the current disclosure is directed.

At operation 908, the imaging system reformats the image sequence along the landmark plane to produce a first reformatted image sequence. The first reformatted image sequence comprises a plurality of 2D images, wherein each of the plurality of 2D images is parallel to the landmark plane. By reformatting the image sequence along the landmark plane, wherein the landmark plane intersects an anatomical region of interest in a pre-determined orientation (e.g., to produce a standard view of the anatomical region), the desired standard view of the anatomical region of interest is included in the first reformatted image sequence. The reformation process conducted at operation 908 may introduce artifacts into the first reformatted image sequence, such as step edges or blur.

At operation 910, the imaging system maps the first reformatted image sequence, the image sequence, and the landmark plane, to a resolution enhanced image sequence using a trained image enhancement network. In some embodiments, the trained image enhancement network includes a plurality of learned three-dimensional (3D) convolutional filters, wherein the plurality of learned 3D convolutional filters receive spatially contiguous data from spatially corresponding sub-regions of both the image sequence and the first reformatted image sequence, or from a subsequently produced 3D feature map. The image enhancement network may comprise one or more convolutional layers, comprising one or more learned 3D convolutional filters. The 3D convolutional filters may be used to detect features in the image sequence (that is, the diagnostic image sequence) and the first reformatted image sequence, such as edges, corners, and shapes, by applying the plurality of learned 3D filters to the image sequence and the first reformatted image sequence.

In some embodiments, the plurality of 3D convolutional filters are convolved with the image sequence and the first reformatted image sequence to detect learned features, which may be output as a feature map. In some embodiments, 3D convolutional filters configured to receive the image sequence, the first reformatted image sequence, and the landmark plane, may comprise a four-dimensional matrix, wherein three of the dimensions of the matrix correspond to spatial dimensions of the image sequence, and the fourth dimension corresponds to different input channels (e.g., the image sequence may be thought of as a first input channel, the first reformatted image sequence may be thought of as a second input channel, and the landmark plane may be thought of as a third input channel). In a particular example, one embodiment of a 3D convolutional filter may comprise a 3×3×3×n matrix, wherein the matrix is configured to receive a spatially contiguous 3×3×3 "patch" of input data from n distinct input channels. In another particular example, a first convolutional layer, configured to receive the image sequence, the first reformatted input sequence, and the landmark plane, as input, may comprise m distinct 3D convolutional filters, comprising m distinct four-dimensional matrices, wherein the four-dimensional matrices are of the form A×A×A×3, wherein A is the size of the spatially contiguous "patch" of 3D data taken as input from the respective image sequences, and wherein 3 corresponds to the three input channels (a first for the image sequence, a second for the first reformatted image sequence, and a third for the landmark plane). Each of the m 3D convolutional filters may produce a respective plurality of features, after convolving the input data, thus generating a feature map of three spatial dimensions, and one channel dimension of size m (one channel per convolutional filter in the first layer). Convolutional filters in the subsequent layer may therefore be of the form B×B×B×m, where B is the size of the spatially contiguous "patch" of input data taken as input, for each of the m distinct features determined by the preceding m distinct convolutional filters. A final layer of the image enhancement network may receive a feature map of size X×Y×Z×o, wherein X×Y×Z correspond to a resolution of the feature map in the X, Y, and Z spatial dimensions, respectively, and wherein o corresponds to the number of feature channels produced by the penultimate layer of the image enhancement network. In some embodiments, the final layer of the image enhancement network may map the feature map of size X×Y×Z×o to an image sequence of size X×Y×Z×1, e.g., by performing a convolution using 1 distinct convolutional filters each of size 1×1×1×o, wherein 1 is the number of color channels in the resolution enhanced image sequence.

The resolution enhanced image sequence comprises a plurality of 2D images corresponding to the first reformatted image sequence, wherein each of the plurality of 2D images is parallel to the landmark plane. In some embodiments, there may be a one-to-one correspondence between 2D images of the first reformatted image sequence and the resolution enhanced image sequence (e.g., for a first image of the first reformatted image sequence, there may be exactly one corresponding image in the resolution enhanced image sequence which captures the same, or substantially similar anatomical features).

At operation 912, the imaging system displays the resolution enhanced image sequence via a display device. In some embodiments, an image of the resolution enhanced image sequence corresponding to the landmark plane, may be displayed at operation 912, thereby enabling a radiologist to quickly view the anatomical region of interest in a standard orientation, which may facilitate evaluation of the imaging subject. Following operation 912, method 900 may end.

Referring to FIG. 10, an illustration 1000 of the method 900 for performing machine learning assisted MPR of an image sequence is shown. Illustration 1000 shows a diagnostic image sequence 1002 of an image volume, such as the diagnostic image sequence acquired at operation 906 of method 900. The diagnostic image sequence 1002 comprises a plurality of 2D images parallel to a first plane. Illustration 1000 further shows a reformatted image sequence 1004, comprising a plurality of 2D images parallel to a landmark plane 1006, wherein the landmark plane 1006 is automatically determined as described at operation 904 of method 900 above. The reformatted image sequence 1004 was generated from the diagnostic image sequence 1002 by MPR of the diagnostic image sequence along the landmark plane 1006, as described above at operation 908. The diagnostic image sequence 1002, the reformatted image sequence 1004, and the landmark plane 1006, are fed as input to a trained image enhancement network 1008, which maps the reformatted image sequence to a resolution enhanced image sequence 1010, based on the diagnostic image sequence 1002, and the landmark plane 1006. The resolution enhanced image sequence 1010 may capture a same portion of the imaging volume as the reformatted image sequence 1004, and may include a same number and orientation of image slices, as the reformatted image sequence 1004, however the resolution of the resolution enhanced image sequence 1010 is greater than the resolution of the reformatted image sequence 1004, at least within the plane of the images comprising the resolution enhanced image sequence 1010.

Figure 11:
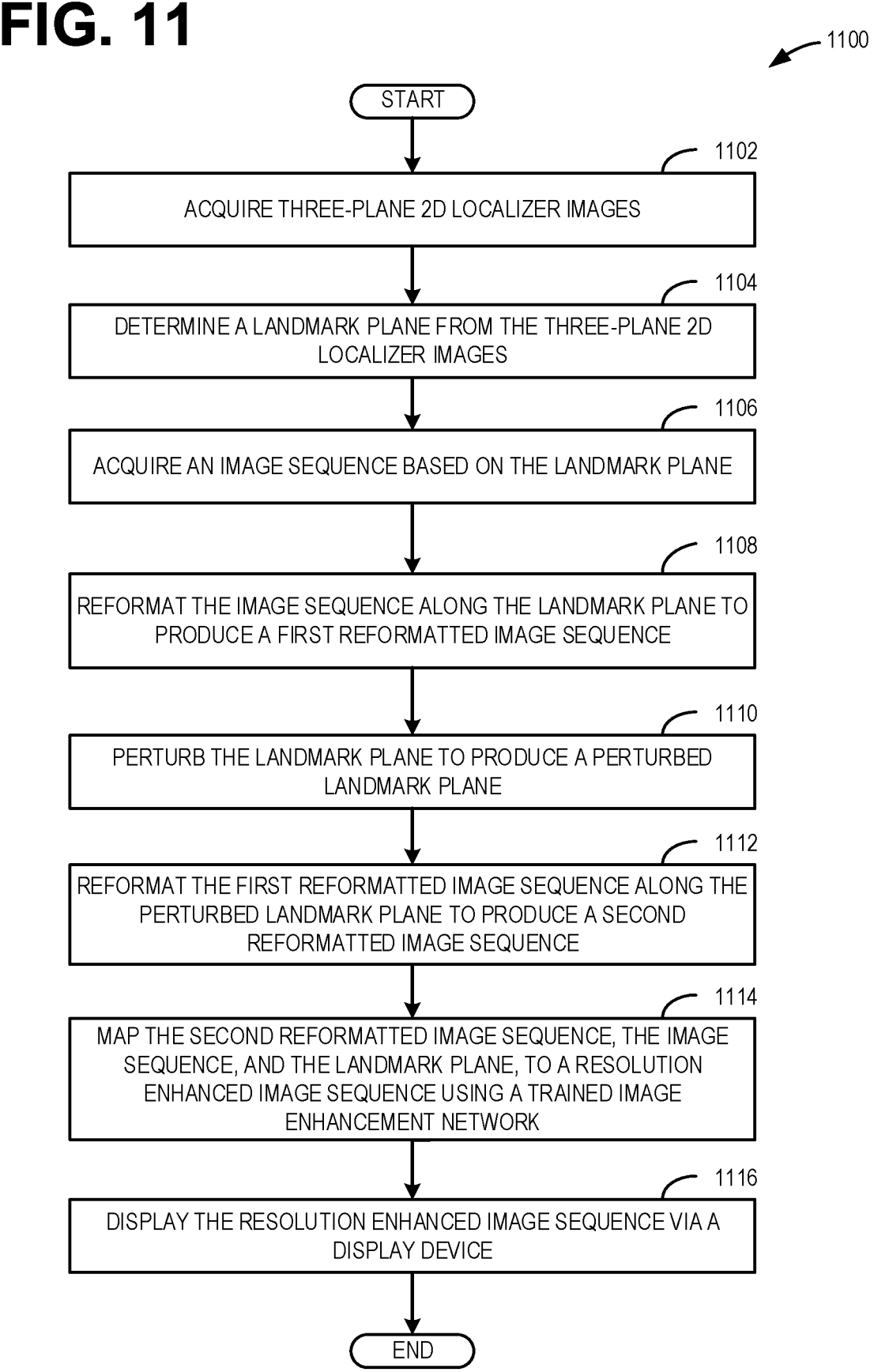
FIG. 11 is a flowchart of a second embodiment of a method for performing retrospective reconstruction of an image sequence using a trained image enhancement network, according to an embodiment of the disclosure.

Referring to FIG. 11, a second embodiment of a method 1100 for performing machine learning assisted MPR of an image sequence using a trained image enhancement network is shown. Method 1100 may be performed by an imaging system, such as imaging system 200 shown in FIG. 2, using a trained image enhancement network, such as the image enhancement network trained using method 700 shown in FIG. 7, with training data produced by one or more of methods 300 and/or 500.

Method 1100 begins at operation 1102, wherein the imaging system acquires three-plane localizer images of a volume. Three-plane localizer images are 2D images which provide a three-dimensional view of the volume to be imaged. In some embodiments, three-plane localizer images are taken from the axial, sagittal, and coronal planes, which are perpendicular to each other. Three-plane localizer images may be used to plan a diagnostic scan by providing a comprehensive view of the volume to be imaged (e.g., a body of the imaging subject). The three-plane localizer images may be used to identify a location of an area of interest, as well as the size and shape of the area of interest. This information can then be used to determine scanning parameters for the diagnostic scan, such as the type of scan, the angle of the scan, and the number of slices to be taken, and the slice thickness. The three-plane localizer images may also be used to identify potential obstacles that may interfere with the scan, such as bones, organs, or implants.

At operation 1104, the imaging system determines a landmark plane from the three-plane localizer images. In some embodiments, the landmark plane is determined based on three-plane localizer images of the volume, using a landmark plane segmentation model, wherein the landmark plane intersects a pre-determined anatomical region. The landmark plane segmentation model may comprise a deep learning model configured to receive the three-plane localizer images as input features, and output one or more landmark planes (also referred to herein as planes of interest). In some embodiments, the landmark plane segmentation model comprises one or more learned convolutional filters. In some embodiments, at operation 1104, multiple landmark planes may be determined. As an example, a diagnostic scan may capture an anatomical region of interest, and operation 1104 may include determining multiple planes which capture standard views of the anatomical region of interest, wherein the standard views may include more than one orientation of the anatomical region of interest (e.g., acquiring both a sagittal and coronal view of the same anatomical region of interest). In another example, a diagnostic scan may capture multiple anatomical regions of interest, wherein at operation 1104 the imaging system may determine at least one landmark plane for each anatomical region of interest, wherein the landmark planes capture the respective anatomical regions of interest in one or more standard views.

At operation 1106, the imaging system acquires an image sequence based on the landmark plane. The image sequence comprises a plurality of 2D images, wherein each of the plurality of 2D images is parallel to a first plane, and wherein the landmark plane is not parallel the first plane. The image sequence acquired at operation 1106 may be referred to as a native image sequence, as the plurality of 2D images comprising the image sequence have not been reformatted. In the trivial case, the first plane (that is, the orientation of the images of the diagnostic scan) is parallel to the landmark plane, and therefore the image sequence may include the desired standard view of the anatomical region of interest, however, in most cases the diagnostic imaging sequence is not parallel to the landmark plane, or if there are multiple non-parallel landmark planes, the imaging sequence may not be parallel to all of the landmark planes, thus necessitating retrospective MPR. It is the non-trivial case of retrospective MPR to which the current disclosure is directed.

At operation 1108, the imaging system reformats the image sequence along the landmark plane to produce a first reformatted image sequence. The first reformatted image sequence comprises a plurality of 2D images, wherein each of the plurality of 2D images is parallel to the landmark plane. By reformatting the image sequence along the landmark plane, wherein the landmark plane intersects an anatomical region of interest in a pre-determined orientation (e.g., to produce a standard view of the anatomical region), the desired standard view of the anatomical region of interest is included in the first reformatted image sequence. The reformation process conducted at operation 1108 may introduce artifacts into the first reformatted image sequence, such as step edges or blur.

At operation 1110, the imaging system perturbs the landmark plane, to produce a perturbed landmark plane. The perturbation of the landmark plane may comprise a small (e.g., less than 5%) change in one or more cosine angles of the landmark plane, thereby producing a perturbed landmark plane which is substantially similar to the landmark plane. In some embodiments, the imaging system may perturb the landmark plane by generating one or more random numbers, within a pre-determined range, and adding the one or more random numbers to one or more plane parameters of the landmark plane, to produce a perturbed set of plane parameters defining the perturbed landmark plane.

At operation 1112, the imaging system reformats the first reformatted image sequence along the perturbed landmark plane to produce a second reformatted image sequence. The second reformatted image sequence comprises a plurality of 2D images, wherein each of the plurality of 2D images is parallel to the perturbed landmark plane. By reformatting the first reformatted image sequence along the perturbed landmark plane, wherein the perturbed landmark plane is substantially similar to the landmark plane, and therefore intersects the anatomical region of interest within a threshold of a pre-determined orientation (e.g., to produce a standard view of the anatomical region), the desired standard view of the anatomical region of interest is included in the second reformatted image sequence. The reformation process conducted at operation 1112 may not introduce substantially new artifacts compared to those in the first reformatted image sequence, as the degree of perturbation is small with respect to the landmark plane.

At operation 1114, the imaging system maps the second reformatted image sequence, the image sequence, and the landmark plane, to a resolution enhanced image sequence using a trained image enhancement network. In some embodiments, the trained image enhancement network includes a plurality of learned three-dimensional (3D) convolutional filters, wherein the plurality of learned 3D convolutional filters receive spatially contiguous data from spatially corresponding sub-regions of both the image sequence and the second reformatted image sequence, or from a subsequently produced 3D feature map. The resolution enhanced image sequence comprises a plurality of 2D images corresponding to the second reformatted image sequence, wherein each of the plurality of 2D images is parallel to the perturbed landmark plane. In some embodiments, there may be a one-to-one correspondence between 2D images of the second reformatted image sequence and the resolution enhanced image sequence.

At operation 1116, the imaging system displays the resolution enhanced image sequence via a display device. In some embodiments, an image of the resolution enhanced image sequence corresponding to the landmark plane, may be displayed at operation 1116, thereby enabling a radiologist to quickly view the anatomical region of interest in a standard orientation, which may facilitate evaluation of the imaging subject. Following operation 1116, method 1100 may end.

Referring to FIG. 12, an illustration 1200 of the method 1100 for performing machine learning assisted MPR of an image sequence is shown. Illustration 1200 shows a diagnostic/native image sequence 1202 of an image volume, such as the diagnostic image sequence acquired at operation 1106 of method 1100. The diagnostic image sequence 1202 comprises a plurality of 2D images parallel to a first plane. Illustration 1200 further shows a second reformatted image sequence 1204, comprising a plurality of 2D images parallel to a perturbed landmark plane, wherein the perturbed landmark plane is automatically determined as described at operation 1110 of method 1100 above. The second reformatted image sequence 1204 is generated by reformatting a first reformatted image sequence along the perturbed landmark plane, wherein the first reformatted image sequence is generated by reformatting the native image sequence 1202 along the landmark plane 1206, and wherein the perturbed landmark plane is substantially similar to the landmark plane 1206.

The native image sequence 1202, the second reformatted image sequence 1204, and the landmark plane 1206, are fed as input to a trained image enhancement network 1208, which maps the second reformatted image sequence 1204 to a resolution enhanced image sequence 1210, based on the native image sequence 1202, and the landmark plane 1206. The resolution enhanced image sequence 1210 may capture a same portion of the imaging volume as the second reformatted image sequence 1204, and may include a same number and orientation of image slices, as the second reformatted image sequence 1204, however the resolution of the resolution enhanced image sequence 1210 is greater than the resolution of the reformatted image sequence 1204, at least within the plane of the images comprising the resolution enhanced image sequence 1210.

In this way, a diagnostic scan may be performed to acquire an image sequence comprising a first plurality of images in a first orientation (that is, parallel to a first plane), and one or more standard views of one or more anatomical regions of interest may be produced from the image sequence using retrospective MPR, wherein the one or more standard views of the one or more anatomical regions may have a decreased visibility of blur and reformatting artifacts compared to conventional approaches, without imposing strict resolution constraints on the diagnostic scan, thus enabling diagnostic scans to be conducted quickly, without sacrificing diagnostic image resolution of the anatomical regions of interest.

The disclosure also provides support for a method, comprising: determining a landmark plane intersecting a volume, acquiring an image sequence, reformatting the image sequence along the landmark plane to produce a first reformatted image sequence, perturbing the landmark plane to produce a perturbed landmark plane, reformatting the first reformatted image sequence along the perturbed landmark plane to produce a second reformatted image sequence, mapping the second reformatted image sequence, the image sequence, and the landmark plane, to a resolution enhanced image sequence, using a trained image enhancement network, and displaying the resolution enhanced image sequence via a display device. In a first example of the method, the landmark plane is determined based on three-plane localizer images of the volume, using a landmark plane segmentation model, and wherein the landmark plane intersects a pre-determined anatomical region. In a second example of the method, optionally including the first example, the image sequence comprises a plurality of two-dimensional (2D) images, wherein each of the plurality of 2D images is parallel to a first plane, and wherein the landmark plane is not parallel to the first plane. In a third example of the method, optionally including one or both of the first and second examples, the first reformatted image sequence comprises a plurality of two-dimensional (2D) images, wherein each of the plurality of 2D images is parallel to the landmark plane. In a fourth example of the method, optionally including one or more or each of the first through third examples, the resolution enhanced image sequence comprises a plurality of two-dimensional (2D) images corresponding to the second reformatted image sequence, wherein each of the plurality of 2D images is parallel to the perturbed landmark plane. In a fifth example of the method, optionally including one or more or each of the first through fourth examples, the trained image enhancement network includes a plurality of learned convolutional filters. In a sixth example of the method, optionally including one or more or each of the first through fifth examples, the plurality of learned convolutional filters receive the second reformatted image sequence.

The disclosure also provides support for a method for training an image enhancement network, comprising: selecting a training data pair comprising input data and a ground truth image sequence, wherein the input data comprises: a landmark plane, a reformatted image sequence, and a native image sequence comprising a first plurality of images parallel to a first plane, and mapping the input data to a predicted resolution enhanced image sequence using the image enhancement network, determining a loss based on a difference between the predicted resolution enhanced image sequence and the ground truth image sequence, and updating parameters of the image enhancement network based on the loss to produce a trained image enhancement network. In a first example of the method, the landmark plane intersects a pre-determined anatomical region, and wherein the landmark plane is automatically determined using a landmark plane segmentation model. In a second example of the method, optionally including the first example the method further comprising: generating the training data pair by: receiving the native image sequence of a volume, selecting the landmark plane intersecting the volume, reformatting the native image sequence along the landmark plane to produce a second image sequence comprising a second plurality of images parallel to the landmark plane, determining an inverse plane to the landmark plane, reformatting the second image sequence along the inverse plane to produce the reformatted image sequence comprising a third plurality of images parallel to the first plane, determining an overlap region of the native image sequence and the reformatted image sequence, storing the overlap region as the ground truth image sequence of the training data pair, and storing the landmark plane, the reformatted image sequence, and the native image sequence, as the input data of the training data pair. In a third example of the method, optionally including one or both of the first and second examples, determining the inverse plane to the landmark plane comprises determining a set of transformations which map from the landmark plane to the first plane. In a fourth example of the method, optionally including one or more or each of the first through third examples, determining the overlap region of the native image sequence and the reformatted image sequence comprises masking out regions of the native image sequence outside of an intersection between a foreground of the native image sequence and a foreground of the reformatted image sequence. In a fifth example of the method, optionally including one or more or each of the first through fourth examples the method further comprising: generating the training data pair by: receiving a high-resolution native image sequence of a volume, downsampling the high-resolution native image sequence to produce the native image sequence, reformatting the native image sequence along the landmark plane to produce the reformatted image sequence comprising a second plurality of images parallel to the landmark plane, reformatting the high-resolution native image sequence along the landmark plane to produce the ground truth image sequence, and storing the ground truth image sequence, and the input data comprising the landmark plane, the reformatted image sequence, and the native image sequence, as the training data pair. In a sixth example of the method, optionally including one or more or each of the first through fifth examples, downsampling the high-resolution native image sequence to produce the native image sequence further includes: adding noise to the high-resolution native image sequence. In a seventh example of the method, optionally including one or more or each of the first through sixth examples, the high-resolution native image sequence comprises a third plurality of images, and wherein downsampling the high-resolution native image sequence to produce the native image sequence comprises: reducing spatial resolution of each of the third plurality of images, and reducing a number of the third plurality of images.

The disclosure also provides support for an imaging system, comprising: an imaging device, a display device, and an image processing system configured with a processor, and executable instructions stored in non-transitory memory, wherein, when executing the instructions, the processor causes the imaging system to: determine a landmark plane intersecting a volume, acquire an image sequence of the volume based on the landmark plane, reformat the image sequence along the landmark plane to produce a first reformatted image sequence, map the first reformatted image sequence, the image sequence, and the landmark plane, to a resolution enhanced image sequence, using a trained image enhancement network, and display the resolution enhanced image sequence via the display device. In a first example of the system, the landmark plane is determined based on three-plane localizer images of the volume acquired via the imaging device, using a landmark plane segmentation model, and wherein the landmark plane intersects a pre-determined anatomical region. In a second example of the system, optionally including the first example, the image sequence comprises a plurality of two-dimensional (2D) images, wherein each of the plurality of 2D images is parallel to a first plane, and wherein the landmark plane is not parallel the first plane. In a third example of the system, optionally including one or both of the first and second examples, the first reformatted image sequence comprises a plurality of two-dimensional (2D) images, wherein each of the plurality of 2D images is parallel to the landmark plane. In a fourth example of the system, optionally including one or more or each of the first through third examples, the resolution enhanced image sequence comprises a plurality of two-dimensional (2D) images corresponding to the first reformatted image sequence, wherein each of the plurality of 2D images is parallel to the landmark plane.

As used herein, an element or step recited in the singular and preceded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
    determining a landmark plane intersecting a volume;
    acquiring an image sequence;
    reformatting the image sequence along the landmark plane to produce a first reformatted image sequence;
    perturbing the landmark plane to produce a perturbed landmark plane;
    reformatting the first reformatted image sequence along the perturbed landmark plane to produce a second reformatted image sequence;
    mapping the second reformatted image sequence, the image sequence, and the landmark plane, to a resolution enhanced image sequence, using a trained image enhancement network; and
    displaying the resolution enhanced image sequence via a display device.

2. The method of claim 1, wherein the landmark plane is determined based on three-plane localizer images of the volume, using a landmark plane segmentation model, and wherein the landmark plane intersects a pre-determined anatomical region.

3. The method of claim 1, wherein the image sequence comprises a plurality of two-dimensional (2D) images, wherein each of the plurality of 2D images is parallel to a first plane, and wherein the landmark plane is not parallel to the first plane.

4. The method of claim 1, wherein the first reformatted image sequence comprises a plurality of two-dimensional (2D) images, wherein each of the plurality of 2D images is parallel to the landmark plane.

5. The method of claim 1, wherein the resolution enhanced image sequence comprises a plurality of two-dimensional (2D) images corresponding to the second reformatted image sequence, wherein each of the plurality of 2D images is parallel to the perturbed landmark plane.

6. The method of claim 1, wherein the trained image enhancement network includes a plurality of learned convolutional filters.

7. The method of claim 6, wherein the plurality of learned convolutional filters receive the second reformatted image sequence.

8. A method for training an image enhancement network, comprising:
    selecting a training data pair comprising input data and a ground truth image sequence, wherein the input data comprises:
        a landmark plane;
        a reformatted image sequence; and
        a native image sequence comprising a first plurality of images parallel to a first plane; and
    mapping the input data to a predicted resolution enhanced image sequence using the image enhancement network;
    determining a loss based on a difference between the predicted resolution enhanced image sequence and the ground truth image sequence; and
    updating parameters of the image enhancement network based on the loss to produce a trained image enhancement network.

9. The method of claim 8, wherein the landmark plane intersects a pre-determined anatomical region, and wherein the landmark plane is automatically determined using a landmark plane segmentation model.

10. The method of claim 8, the method further comprising:
    generating the training data pair by:
        receiving the native image sequence of a volume;
        selecting the landmark plane intersecting the volume;
        reformatting the native image sequence along the landmark plane to produce a second image sequence comprising a second plurality of images parallel to the landmark plane;

determining an inverse plane to the landmark plane;
reformatting the second image sequence along the inverse plane to produce the reformatted image sequence comprising a third plurality of images parallel to the first plane;
determining an overlap region of the native image sequence and the reformatted image sequence;
storing the overlap region as the ground truth image sequence of the training data pair, and
storing the landmark plane, the reformatted image sequence, and the native image sequence, as the input data of the training data pair.

11. The method of claim 10, wherein determining the inverse plane to the landmark plane comprises determining a set of transformations which map from the landmark plane to the first plane.

12. The method of claim 10, wherein determining the overlap region of the native image sequence and the reformatted image sequence comprises masking out regions of the native image sequence outside of an intersection between a foreground of the native image sequence and a foreground of the reformatted image sequence.

13. The method of claim 8, the method further comprising:
generating the training data pair by:
receiving a high-resolution native image sequence of a volume;
downsampling the high-resolution native image sequence to produce the native image sequence;
reformatting the native image sequence along the landmark plane to produce the reformatted image sequence comprising a second plurality of images parallel to the landmark plane;
reformatting the high-resolution native image sequence along the landmark plane to produce the ground truth image sequence; and
storing the ground truth image sequence, and the input data comprising the landmark plane, the reformatted image sequence, and the native image sequence, as the training data pair.

14. The method of claim 13, wherein downsampling the high-resolution native image sequence to produce the native image sequence further includes:
adding noise to the high-resolution native image sequence.

15. The method of claim 13, wherein the high-resolution native image sequence comprises a third plurality of images, and wherein downsampling the high-resolution native image sequence to produce the native image sequence comprises:
reducing spatial resolution of each of the third plurality of images; and
reducing a number of the third plurality of images.

16. An imaging system, comprising:
an imaging device;
a display device; and
an image processing system configured with a processor, and executable instructions stored in non-transitory memory, wherein, when executing the instructions, the processor causes the imaging system to:
determine a landmark plane intersecting a volume;
acquire an image sequence of the volume based on the landmark plane;
reformat the image sequence along the landmark plane to produce a first reformatted image sequence;
map the first reformatted image sequence, the image sequence, and the landmark plane, to a resolution enhanced image sequence, using a trained image enhancement network; and
display the resolution enhanced image sequence via the display device.

17. The imaging system of claim 16, wherein the landmark plane is determined based on three-plane localizer images of the volume acquired via the imaging device, using a landmark plane segmentation model, and wherein the landmark plane intersects a pre-determined anatomical region.

18. The imaging system of claim 16, wherein the image sequence comprises a plurality of two-dimensional (2D) images, wherein each of the plurality of 2D images is parallel to a first plane, and wherein the landmark plane is not parallel the first plane.

19. The imaging system of claim 16, wherein the first reformatted image sequence comprises a plurality of two-dimensional (2D) images, wherein each of the plurality of 2D images is parallel to the landmark plane.

20. The imaging system of claim 16, wherein the resolution enhanced image sequence comprises a plurality of two-dimensional (2D) images corresponding to the first reformatted image sequence, wherein each of the plurality of 2D images is parallel to the landmark plane.

* * * * *